United States Patent
Park et al.

(10) Patent No.: US 6,747,963 B1
(45) Date of Patent: Jun. 8, 2004

(54) APPARATUS AND METHOD FOR GATED TRANSMISSION IN A CDMA COMMUNICATION SYSTEM

(75) Inventors: Chang-Soo Park, Seoul (KR); Jae-Min Ahn, Seoul (KR); Hyun-Woo Lee, Suwon-shi (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/547,886

(22) Filed: Apr. 12, 2000

(30) Foreign Application Priority Data

| Apr. 12, 1999 | (KR) | ................................. | 1999-13610 |
| May 26, 1999 | (KR) | ................................. | 1999-19080 |
| Jul. 7, 1999 | (KR) | ................................. | 1999-27355 |
| Jul. 8, 1999 | (KR) | ................................. | 1999-27398 |

(51) Int. Cl.[7] .............................................. H04B 7/216
(52) U.S. Cl. ..................................... 370/335; 370/342
(58) Field of Search ............................... 370/320, 322, 370/335, 342, 441

(56) References Cited

U.S. PATENT DOCUMENTS

| 4,787,095 A | | 11/1988 | Forth et al. | .................. 375/114 |
| 5,212,685 A | | 5/1993 | Stilwell, Jr. et al. | .......... 370/31 |
| 5,583,870 A | | 12/1996 | Delprat et al. | |
| 6,009,091 A | * | 12/1999 | Stewart et al. | ............... 370/342 |
| 6,035,209 A | * | 3/2000 | Tiedemann et al. | .......... 455/522 |
| 6,192,040 B1 | * | 2/2001 | Jalloul et al. | ................ 370/335 |
| 6,480,481 B1 | * | 11/2002 | Park et al. | |
| 6,587,447 B1 | * | 7/2003 | Wang et al. | ..................... 370/335 |
| 2002/0009061 A1 | * | 1/2002 | Willenegger | ................. 370/328 |

FOREIGN PATENT DOCUMENTS

| EP | 0 529 269 | 3/1993 | | |
| JP | 6-268575 | 9/1994 | ............. | H04B/7/26 |
| JP | 6-350547 | 12/1994 | ............. | H04J/3/00 |
| JP | 9-121187 | 6/1997 | ............. | H04B/7/26 |
| WO | WO 99/56405 | 11/1999 | | |
| WO | WO 00/35126 | 6/2000 | | |

OTHER PUBLICATIONS

Chinese Office Action dated Jul. 25, 2003 issued in a counterpart application, namely, Appln. No. 00806189.0.
European Search Report dated Sep. 3, 2002, issued in a counterpart application, namely EP Appln. No. 00921136.8.
Steve Dennett, "The CDMA 2000 ITU-R RTT Candidate Submission (0.18)", Jul. 27, 1998.

* cited by examiner

Primary Examiner—Chau Nguyen
Assistant Examiner—Christine Ng
(74) Attorney, Agent, or Firm—DIlworth & Barrese LLP

(57) ABSTRACT

A method and device for gating the transmission of dedicated control channels in a CDMA communication system is disclosed. In the device and method, if a base station (mobile station) determines whether there is no data to transmit to a mobile station (base station) for predetermined period of time, the base station (mobile station) gates transmission of control information according to a predetermined pattern on a dedicated control channel, which channel is used for transmitting control information to the mobile station (base station). Control information transmitted from the base station to the mobile station includes Transport Format Combination Indicator (TFCI), Transmit Power Control (TPC), and a pilot symbol. Control information transmitted from the mobile station to the base station includes TFCI, TPC, a pilot symbol, and FeedBack Information (FBI) for information about a transmit diversity antenna system. In a downlink DPCCH, transmission of the TFCI, TPC and pilot symbol is transmitted discontinuously at every predetermined nth slot out of the total slots of a frame during gated transmission. Alternatively, transmission of the pilot symbol can be transmitted discontinuously at every predetermined nth slot and the TFCI and the TPC at every (n+1)th slot. In an uplink DPCCH, the TFCI, TPC, FBI and pilot symbol are transmitted discontinuously at a specific slot during gated transmission. In addition, the TPC for power control can be continuously transmitted for full rate power control when there is traffic data for transmission.

26 Claims, 32 Drawing Sheets

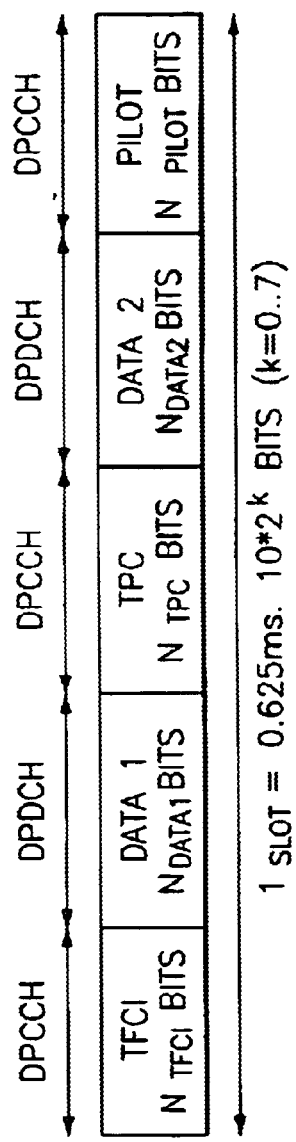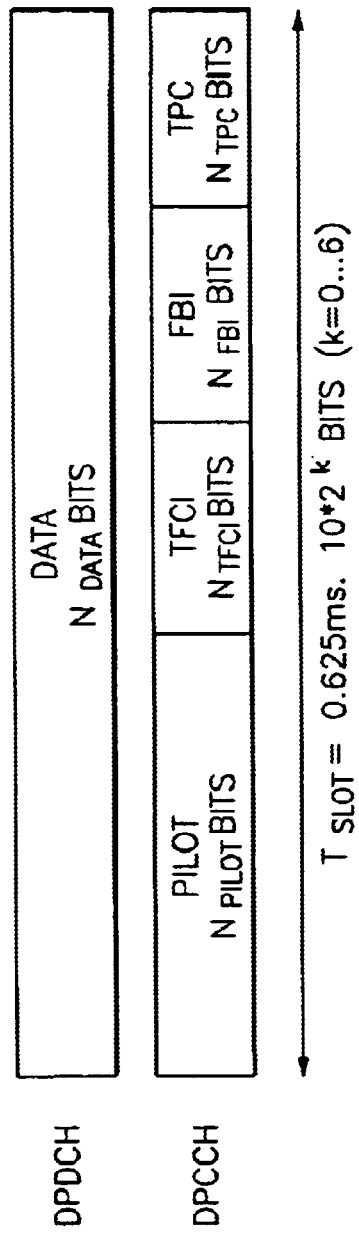

though there is no traffic data to transmit. This is done in order to minimize the time delay due to sync. reacquisition when there is traffic data to transmit.

APPARATUS AND METHOD FOR GATED TRANSMISSION IN A CDMA COMMUNICATION SYSTEM

PRIORITY

This application claims priority to an application entitled "Apparatus and Method for Gated Transmission in CDMA Communication System" filed in the Korean Industrial Property Office on Apr. 12, 1999 and assigned Ser. No. 99-13610, filed on May 26, 1999, as well as Korean Application Ser. No. 99-19080, filed on Jul. 7, 1999, Korean Application Ser. No. 99-27355, filed on Jul. 8, 1999, and Korea Application Ser. No. 99-27398, the contents of all of which are hereby incorporated by reference.

BACKGROUND OF THE INVENTION

1. Field of the Invention

The present invention relates generally to a CDMA mobile communication system, and in particular, to an apparatus and method for gated transmission which does not require a separate resynchronization process by assigning dedicated channels.

2. Description of the Related Art

A conventional CDMA (Code Division Multiple Access) mobile communication system primarily provides a voice service. However, the future CDMA mobile communication system will support the IMT-2000 standard, which can provide high-speed data service as well as voice service. More specifically, the IMT-2000 standard can provide high-quality voice service, moving picture service, an Internet search service, etc.

In a mobile communication system, data communication is typically characterized by bursts of data transmissions alternating with long non-transmission periods. The bursts of data are referred to as "packets" or "packages" of data. In the future mobile communication system, traffic data is transmitted over a dedicated traffic channel for a data transmission duration, and the dedicated traffic channel is maintained for a predetermined time even when the base station and the mobile station have no traffic data to transmit. The mobile communication system, after finishing transmitting traffic data over the dedicated traffic channel, maintains the downlink and uplink channels between the base station and the mobile station for a predetermined time even though there is no traffic data to transmit. This is done in order to minimize the time delay due to sync. reacquisition when there is traffic data to transmit.

The invention will be described with reference to a UTRA (UMTS (Universal Mobile Telecommunications System) Terrestrial Radio Access) mobile communication system. Such a mobile communication system requires many states according to channel assignment circumstances and state information existence/nonexistence in order to provide a packet data service as well as a voice service. For example, a state transition diagram for a cell connected state, a user data active substate and a control-only substate are well defined in 3GPP RAN TS S2 series S2.03, 99. 04.

FIG. 1A shows state transition in the cell connected state of the mobile communication system. Referring to FIG. 1A, the cell connected state includes a paging channel (PCH) state, a random access channel (RACH)/downlink shared channel (DSCH) state, a RACH/forward link access channel (FACH) state, and a dedicated channel (DCH)DCH/DCH, DCH/DCH+DSCH, DCH/DSCH+DSCH Ctrl (Control Channel) state.

FIG. 1B shows a user data active substate and a control-only substate of the DCH/DCH, DCH/DCH+DSCH, DCH/DSCH+DSCH Ctrl state. It should be noted that the novel gated transmission device and method is applied when there is no traffic data for a predetermined time.

The existing CDMA mobile communication system, which mainly provides voice service, releases a channel after completion of data transmission and connects the channel again when there is further data to transmit. However, when providing packet data service as well as voice service, the conventional data transmission method has many delaying factors such as reconnection delay, thus making it difficult to provide high-quality service. Therefore, to provide packet data service as well as voice service, an improved data transmission method is required. For example, in many cases, data transmission is performed intermittently, such as for Internet access and file downloading. Therefore, there occurs a non-transmission period between transmissions of packet data. During this period, the conventional data transmission method releases or maintains the dedicated traffic (or data) channel. If the dedicated traffic channel is released, a long time is required in order to reconnect the channel, and, if the dedicated traffic channel is maintained, channel resources are wasted and reverse power is wasted. To solve such problems, a dedicated control channel is provided between the base station and the mobile station so that for the data transmission period, a control signal related to the dedicated traffic channel is exchanged and for the non-transmission period, the dedicated traffic channel is released and only the dedicated control channel is maintained. Such a state is referred to as the "control-only substate".

A downlink (or forward link) for transmitting signals from the base station to the mobile station includes the following physical channels. A description of the physical channels which depart from the scope of the invention will be avoided for simplicity. The physical channels involved in the invention include a dedicated physical control channel (hereinafter, referred to as DPCCH) in which pilot symbols are included for sync acquisition and channel estimation, and a dedicated physical data channel (hereinafter, referred to as DPDCH) for exchanging traffic data with a specific mobile station. The downlink DPDCH includes the traffic data, and the downlink DPCCH includes, at each slot (or power control group), transport format combination indicator (hereinafter, referred to as TFCI) which is information about the format of transmission data, transmit power control (hereinafter, referred to as TPC) information which is a power control command, and control information such as the pilot symbols for providing a reference phase so that a receiver (the base station or the mobile station) can compensate the phase. The DPDCH and the DPCCH are time multiplexed within one power control group in the downlink, and the DPDCH and the DPCCH are separated from each other by orthogonal codes in the uplink.

For reference, the invention will be described with reference to the case where the frame length is 10 msec and each frame includes 16 power control groups, i.e., each power control group has a length of 0.625 msec. Alternatively, the invention will also be described with reference to another case where the frame length is 10 msec and each frame includes 15 power control groups, i.e., each power control group has a length of 0.667 msec. It will be assumed herein that the power control group (0.625 msec or 0.667 msec) has the same time period as the slot (0.625 msec or 0.667 msec). The power control group (or slot) is comprised of pilot symbol, traffic data, transmission data-related information TFCI, and power control information TPC in the downlink. The values stated above are given by way of example only.

FIG. 2A shows a slot structure including the downlink DPDCH and DPCCH. In FIG. 2A, although the DPDCH is divided into traffic data 1 (DATA 1) and traffic data 2 (DATA 2), there is a case where the traffic data 1 does not exist and only the traffic data 2 exists according to the types of the traffic data. Table 1 below shows the symbols constituting the downlink DPDCH/DPCCH fields, wherein the number of TFCI, TPC and pilot bits in each slot can vary according to a data rate and a spreading factor.

Unlike the downlink DPDCH and DPCCH, uplink DPDCH and DPCCH for transmitting signals from the mobile station to the base station are separated by channel separation codes.

FIG. 2B shows a slot structure including the uplink DPDCH and DPCCH. In FIG. 2B, the number of TFCI, FBI, TPC and pilot bits can vary according to the service being provided (which changes the type of the traffic data), or because of transmit antenna diversity, or because of a handover circumstance. The FBI (FeedBack Information) is information that the mobile station requests about the antennas at the base station, when the base station uses the transmit diversity antennas. Tables 2 and 3 below show the symbols constituting the uplink DPDCH and DPCCH fields, respectively.

TABLE 1

Downlink DPDCH/DPCCH Fields

| Channel Bit Rate (kbps) | Channel Symbol Rate (ksps) | SF | Bits/Frame DPDCH | Bits/Frame DPCCH | Bits/Frame TOT | Bits/Slot | DPDCH Bits/Slot $N_{data1}$ | DPDCH Bits/Slot $N_{data2}$ | DPCCH Bits/Slot $N_{TFC1}$ | DPCCH Bits/Slot $N_{TPC}$ | DPCCH Bits/Slot $N_{pilot}$ |
|---|---|---|---|---|---|---|---|---|---|---|---|
| 16 | 8 | 512 | 64 | 96 | 160 | 10 | 2 | 2 | 0 | 2 | 4 |
| 16 | 8 | 512 | 32 | 128 | 160 | 10 | 0 | 2 | 2 | 2 | 4 |
| 32 | 16 | 256 | 160 | 160 | 320 | 20 | 2 | 8 | 0 | 2 | 8 |
| 32 | 16 | 256 | 128 | 192 | 320 | 20 | 0 | 8 | 2 | 2 | 8 |
| 64 | 32 | 128 | 480 | 160 | 640 | 40 | 6 | 24 | 0 | 2 | 8 |
| 64 | 32 | 128 | 448 | 192 | 640 | 40 | 4 | 24 | 2 | 2 | 8 |
| 128 | 64 | 64 | 1120 | 160 | 1280 | 80 | 14 | 56 | 0 | 2 | 8 |
| 128 | 64 | 64 | 992 | 288 | 1280 | 80 | 6 | 56 | 8 | 2 | 8 |
| 256 | 128 | 32 | 2400 | 160 | 2560 | 160 | 30 | 120 | 0 | 2 | 8 |
| 256 | 128 | 32 | 2272 | 288 | 2560 | 160 | 22 | 120 | 8 | 2 | 8 |
| 512 | 256 | 16 | 4832 | 288 | 5120 | 320 | 62 | 240 | 0 | 2 | 16 |
| 512 | 256 | 16 | 4704 | 416 | 5120 | 320 | 54 | 240 | 8 | 2 | 16 |
| 1024 | 512 | 8 | 9952 | 288 | 10240 | 640 | 126 | 496 | 0 | 2 | 16 |
| 1024 | 512 | 8 | 9824 | 416 | 10240 | 640 | 118 | 496 | 8 | 2 | 16 |
| 2048 | 1024 | 4 | 20192 | 288 | 20480 | 1280 | 254 | 1008 | 0 | 2 | 16 |
| 2048 | 1024 | 4 | 20064 | 416 | 20480 | 1280 | 246 | 1008 | 8 | 2 | 16 |

TABLE 2

Uplink DPDCH Fields

| Channel Bit Rate (kbps) | Channel Symbol Rate (ksps) | SF | Bits/Frame | Bits/Slot | $N_{data}$ |
|---|---|---|---|---|---|
| 16 | 16 | 256 | 160 | 10 | 10 |
| 32 | 32 | 128 | 320 | 20 | 20 |
| 64 | 64 | 64 | 640 | 40 | 40 |
| 128 | 128 | 32 | 1280 | 80 | 80 |
| 256 | 256 | 16 | 2560 | 160 | 160 |
| 512 | 512 | 8 | 5120 | 320 | 320 |
| 1024 | 1024 | 4 | 10240 | 640 | 640 |

TABLE 3

Uplink DPCCH Fields

| Channel Bit Rate (kbps) | Channel Symbol Rate (ksps) | SF | Bits/Frame | Bits/Slot | $N_{pilot}$ | $N_{TPC}$ | $N_{TFC1}$ | $N_{FB1}$ |
|---|---|---|---|---|---|---|---|---|
| 16 | 16 | 256 | 160 | 10 | 6 | 2 | 2 | 0 |
| 16 | 16 | 256 | 160 | 10 | 8 | 2 | 0 | 0 |
| 16 | 16 | 256 | 160 | 10 | 5 | 2 | 2 | 1 |
| 16 | 16 | 256 | 160 | 10 | 7 | 2 | 0 | 1 |
| 16 | 16 | 256 | 160 | 10 | 6 | 2 | 0 | 2 |
| 16 | 16 | 256 | 160 | 10 | 5 | 1 | 2 | 2 |

Tables 1 to 3 show an example where there exists one DPDCH which is a traffic channel, wherein SF denotes spreading factor. However, there may exist second, third and fourth DPDCHs according to the service types. Further, the downlink and uplink both may include several DPDCHs.

An exemplary hardware structure of the conventional mobile communication system (base station transmitter and mobile station transmitter) will be described below with reference to FIGS. 3A and 3B. Although the base station transmitter and mobile station transmitter will be described with reference to a case where there exist three DPDCHs, the number of DPDCHs is not limited.

FIG. 3A shows a structure of the conventional base station transmitter. Referring to FIG. 3A, multipliers 111, 121, 131 and 132 multiply a DPDCH signal and DPDCH$_1$, DPDCH$_2$ and DPDCH$_3$ signals, which have undergone channel encoding and interleaving, by gain coefficients $G_1$, $G_2$, $G_3$ and $G_4$, respectively. The gain coefficients $G_1$, $G_2$, $G_3$ and $G_4$ may have different values according to circumstances such as the service option and the handover. A multiplexer (MUX) 112 time-multiplexes the DPCCH signal and the DPDCH$_1$ signal into the slot structure of FIG. 2A. A first serial-to-parallel (S/P) converter 113 distributes the output of the multiplexer 112 to an I channel and a Q channel. Second and third S/P converters 133 and 134 S/P-convert the DPDCH$_2$ and DPDCH$_3$ signals and distribute them to the I channel and the Q channel, respectively. The S/P-converted I and Q channel signals are multiplied by channelization codes $C_{ch1}$, $C_{ch2}$ and $C_{ch3}$ in multipliers 114, 122, 135, 136, 137 and 138, for spreading and channel separation. Orthogonal codes are used for the channelization codes.

The I and Q channel signals multiplied by the channelization codes in the multipliers 114, 122, 135, 136, 137 and 138 are summed by first and second summers 115 and 123, respectively. That is, the I channel signals are summed by the first summer 115, and the Q channel signals are summed by the second summer 123. The output of the second summer 123 is phase shifted by 90° by a phase shifter 124. A summer 116 sums an output of the first summer 115 and an output of the phase shifter 124 to generate a complex signal I+jQ. A multiplier 117 scrambles the complex signal with a PN sequence $C_{scramb}$ which is uniquely assigned to each base station, and a signal separator 118 separates the scrambled signal into a real part and an imaginary part and distributes them to the I channel and the Q channel. The I and Q channel outputs of the signal separator 118 are filtered by lowpass filters 119 and 125, respectively, to generate bandwidth-limited signals. The output signals of the filters 119 and 125 are multiplied by carriers cos $\{2\pi f_c t\}$ and sin $\{2\pi f_c t\}$ in multipliers 120 and 126, respectively, to frequency shift the signals to a radio frequency (RF) band. A summer 127 sums the frequency-shifted I and Q channel signals.

FIG. 3B shows a structure of the conventional mobile station transmitter. Referring to FIG. 3B, multipliers 211, 221, 223 and 225 multiply a DPCCH signal and DPDCH$_1$, DPDCH$_2$ and DPDCH$_3$ signals, which have undergone channel encoding and interleaving, by channelization codes (orthogonal codes) $C_{ch1}$, $C_{ch2}$, $C_{ch3}$ and $C_{ch4}$, respectively, for spreading and channel separation. Orthogonal codes are used for the channelization codes. The output signals of the multipliers 211, 221, 223 and 225 are multiplied by gain coefficients $G_1$, $G_2$, $G_3$ and $G_4$ in multipliers 212, 222, 224 and 226, respectively. The gain coefficients $G_1$, $G_2$, $G_3$ and $G_4$ may have different values. The outputs of the multipliers 212 and 222 are summed by a first summer 213 and output as an I channel signal, and the outputs of the multipliers 224 and 226 are summed by a second summer 227 and output as a Q channel signal. The Q channel signal output from the second summer 227 is phase shifted by 90° in a phase shifter 228.

A summer 214 sums the output of the first summer 213 and the output of the phase shifter 228 to generate a complex signal I+jQ. A multiplier 215 scrambles the complex signal with a PN sequence $C_{scramb}$ which is uniquely assigned to each mobile station, and a signal separator 229 separates the scrambled signal into a real part and an imaginary part and distributes them to the I channel and the Q channel. The I and Q channel outputs of the signal separator 229 are filtered by lowpass filters 216 and 230, respectively, to generate bandwidth-limited signals. The output signals of the filters 216 and 230 are multiplied by carriers cos $\{2\pi f_c t\}$ and sin $\{2\pi f_c t\}$ in multipliers 217 and 231, respectively, to frequency shift the signals to a radio frequency (RF) band. A summer 218 sums the frequency-shifted I and Q channel signals.

A conventional transmission signal structure of the base station and the mobile station will be made below. FIG. 5A shows how to transmit the downlink DPCCH and the uplink DPCCH when transmission of the uplink DPDCH is discontinued. This state, occurring after there is no data to transmit for a predetermined time, is called the control-only substate. FIG. 5B shows how to transmit the downlink DPCCH and the uplink DPCCH when transmission of the downlink DPDCH is discontinued because there is no data to transmit. As illustrated in FIGS. 5A and 5B, the mobile station constantly transmits the uplink DPCCH signal in spite of no DPDCH data in order to avoid a synchronization (sync) reacquisition process between the base station and the mobile station. When there is no traffic data to transmit for a long time, the base station and the mobile station make a transition to an RRC (Radio Resource Control) connection release state (not shown in the FIGs.). In this state, transmission of the uplink DPCCH is discontinued, but the mobile station transmits pilot symbols and power control bits over the DPCCH until the transition is completed, thereby increasing interference in the uplink (or reverse link). The increase in interference of the uplink causes a decrease in the capacity of the uplink.

In the conventional method, although continuous transmission of the uplink DPCCH in the control-only substate is advantageous in that it is possible to avoid the sync reacquisition process in the base station, it increases the interference to the uplink and the consumption of the mobile station power, causing a decrease in the capacity of the uplink. Further, in the downlink, continuous transmission of the uplink power control bits causes an increase in interference of the downlink and a decrease in the capacity of the downlink. Therefore, it is necessary to minimize the time required for the sync reacquisition process in the base station, to minimize the interference due to transmission of the uplink DPCCH, and to minimize the interference and mobile station power consumption due to transmission of the uplink power control bits over the downlink.

SUMMARY OF THE INVENTION

It is, therefore, an object of the present invention to provide a communication device and method for minimizing the time required for a sync reacquisition process between base station and mobile station, for minimizing the interference and power consumption of mobile station due to transmission of a uplink DPCCH, and for minimizing the interference due to transmission of uplink power control bits over a downlink when there is no data to transmit on the DPDCH for predetermined time.

It is another object of the present invention to provide a device and method for gating a dedicated control channel (DPCCH) signal on a gated transmission unit basis in a mobile communication system, wherein the gated transmission unit is either identical to an actual slot unit or different from the actual slot unit.

It is further another object of the present invention to provide a device and method for locating a power control bit in the last slot of each frame to control the power of the first slot of the next frame in a mobile communication system.

To achieve the above and other objects, a base station (or mobile station) according to the present invention determines whether there is data to transmit to the mobile station (or base station) on DPDCH. When there is no data to transmit on the DPDCH, the base station (or mobile station) gates transmission of control information according to a predetermined time period pattern within one frame on a dedicated control channel. Here, "gated transmission" refers to transmitting the control information included in the DPCCH only at a specific power control group (PCG)/slot (or PCGs/slots) according to a predetermined time pattern. Control information transmitted from the base station to the mobile station includes TFCI information about a format of transmission data, TPC information for power control, and a pilot symbol. Control information transmitted from the mobile station to the base station includes TFCI information about a format of transmission data, TPC information for power control, a pilot symbol, and FBI information for requesting information about a phase difference between two antennas when the base station uses transmit diversity antenna. In a downlink DPCCH, the TFCI, TPC and pilot symbol in a predetermined nth power control group (or one slot) can be discontinuously transmitted in a frame during gated transmission. Alternatively, the pilot symbol in a predetermined nth power control group (or slot) and TFCI and TPC in (n+1)th power control group can be discontinuously transmitted in a frame. In an uplink DPCCH, the TFCI, TPC, FBI and pilot symbol in a specific power control group (or slot) are discontinuously transmitted during gated transmission. If there is a short data to transmit on DPDCH during gated transmission mode, the power control bit can be transmitted in all slots during the transmission of the short data. Further, a gating pattern for the downlink control information and a gating pattern for the uplink control information have an offset so that gating should occur at different time points.

BRIEF DESCRIPTION OF THE DRAWINGS

The above and other objects, features and advantages of the present invention will become more apparent from the following detailed description when taken in conjunction with the accompanying drawings in which:

FIG. 2A is a diagram illustrating a slot structure of downlink DPDCH and DPCCH;

FIG. 2B is a diagram illustrating a slot structure of uplink DPDCH and DPCCH;

DETAILED DESCRIPTION OF THE PREFERRED EMBODIMENT

Preferred embodiments of the present invention will be described herein below with reference to the accompanying drawings. In the following description, well-known functions or constructions are not described in detail since they would obscure the invention in unnecessary detail.

The term "normal transmission" as used herein refers to continuously transmitting control information included in the downlink or uplink DPCCH, i.e., TFCI, TPC and pilot symbols. Further, the term "gate transmission" refers to transmitting the control information included in the downlink DPCCH, i.e., TFCI, TPC and pilot symbols, only at a specific power control group (or slot) according to a predetermined time pattern. In addition, the term "gate transmission" refers to transmitting the control information included in the uplink DPCCH (i.e., TFCI, TPC and pilot symbols) only at a specific power control group (or one slot) according to a predetermined time pattern. The information, transmission of which is discontinued in the downlink DPCCH during gated transmission, may include all of the TFCI, TPC and pilot symbols in a predetermined nth power control group (or slot), or may include the pilot symbols in a predetermined nth power control group (or slot), and TFCI and TPC in an (n+1)th power control group. The information, transmission of which is discontinued in the uplink DPCCH during gated transmission, includes all of TFCI, TPC, FBI and pilot symbols in a specific power control group (or one slot). Herein, "a gated transmission unit is identical to a slot unit" means that TFCI, TPC and pilot symbols within one power control group are set as a gated transmission unit. Further, "a gated transmission unit is not identical to a slot unit" means that a pilot symbol in a predetermined nth slot and a TFCI and TPC in an (n+1)th slot are set as a gated transmission unit.

In addition, since performance at the beginning of a frame is very important, the invention locates the TPC for controlling the power of the first slot of the next frame at the last slot of one frame. That is, TPC bits for the downlink DPCCH and the uplink DPCCH are located at the last slot of the nth frame, and power of the first slot of the (n+1)th frame is controlled using the TPC bits existing at the last slot of the nth frame.

Further, a power control rate can be maintained as normal transmission even when transmission data is generated during gated transmission of the DPCCH signal according to the present invention. In addition, the gating pattern (or gated transmission pattern) for the downlink DPCCH and the gating pattern for the uplink DPCCH are determined to have an offset. That is, the control information for the downlink DPCCH and the control information for the uplink DPCCH are transmitted at different time points.

A hardware structure according to an embodiment of the invention will be described below.

Figure 1A:
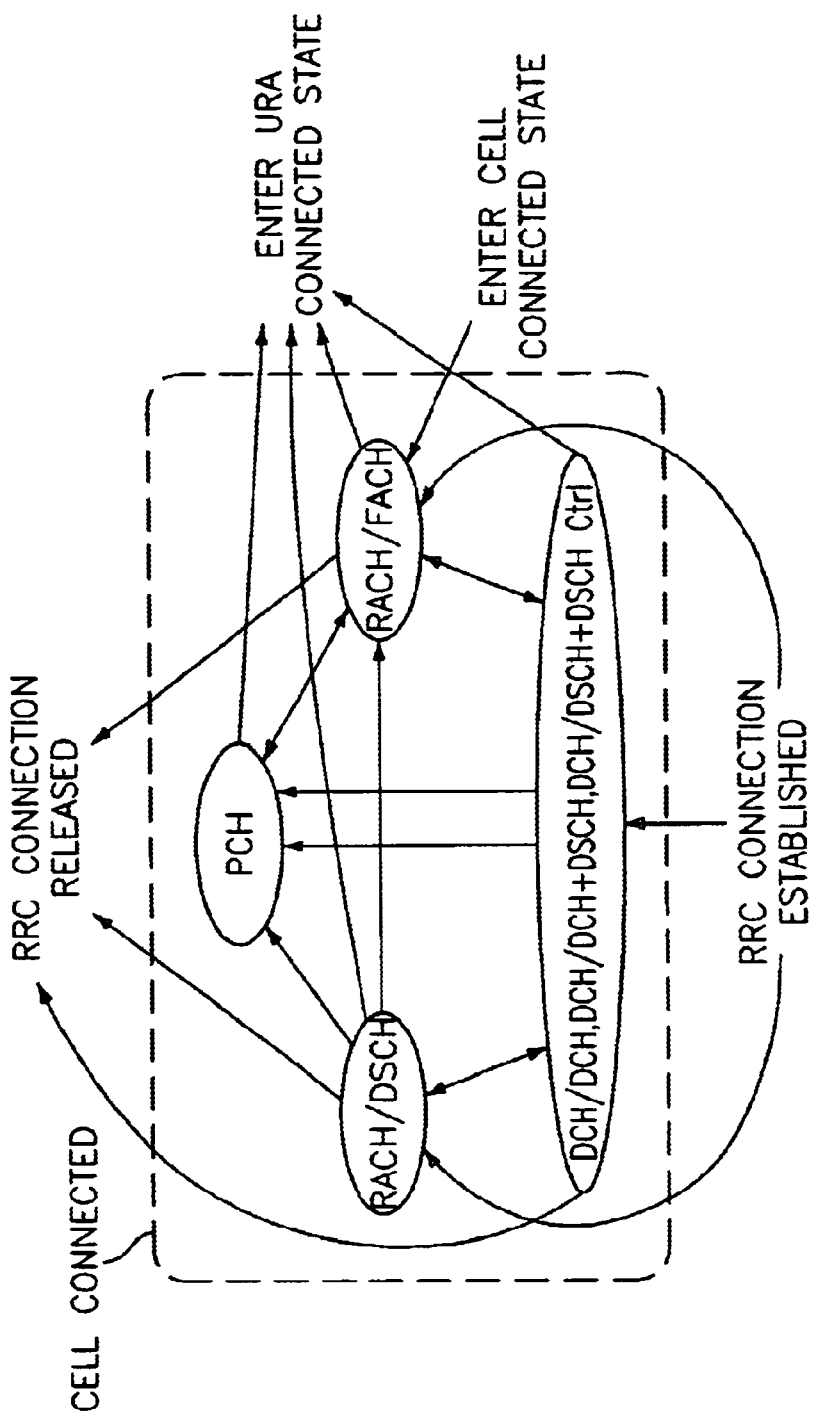
FIG. 1A is a state transition diagram for a packet data service.
Figure 1B:
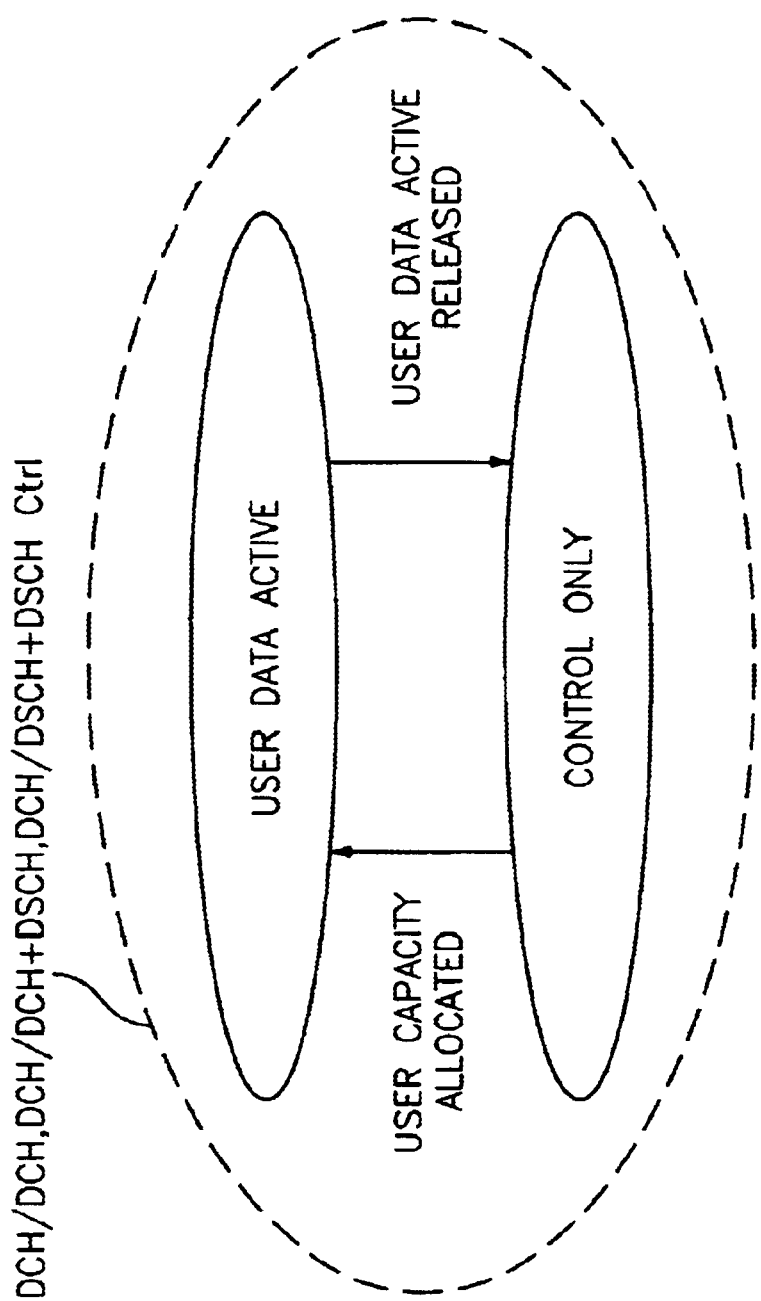
FIG. 1B is a state transition diagram between a user data active substate and a control-only substate of the DCH/DCH state.
Figure 3A:
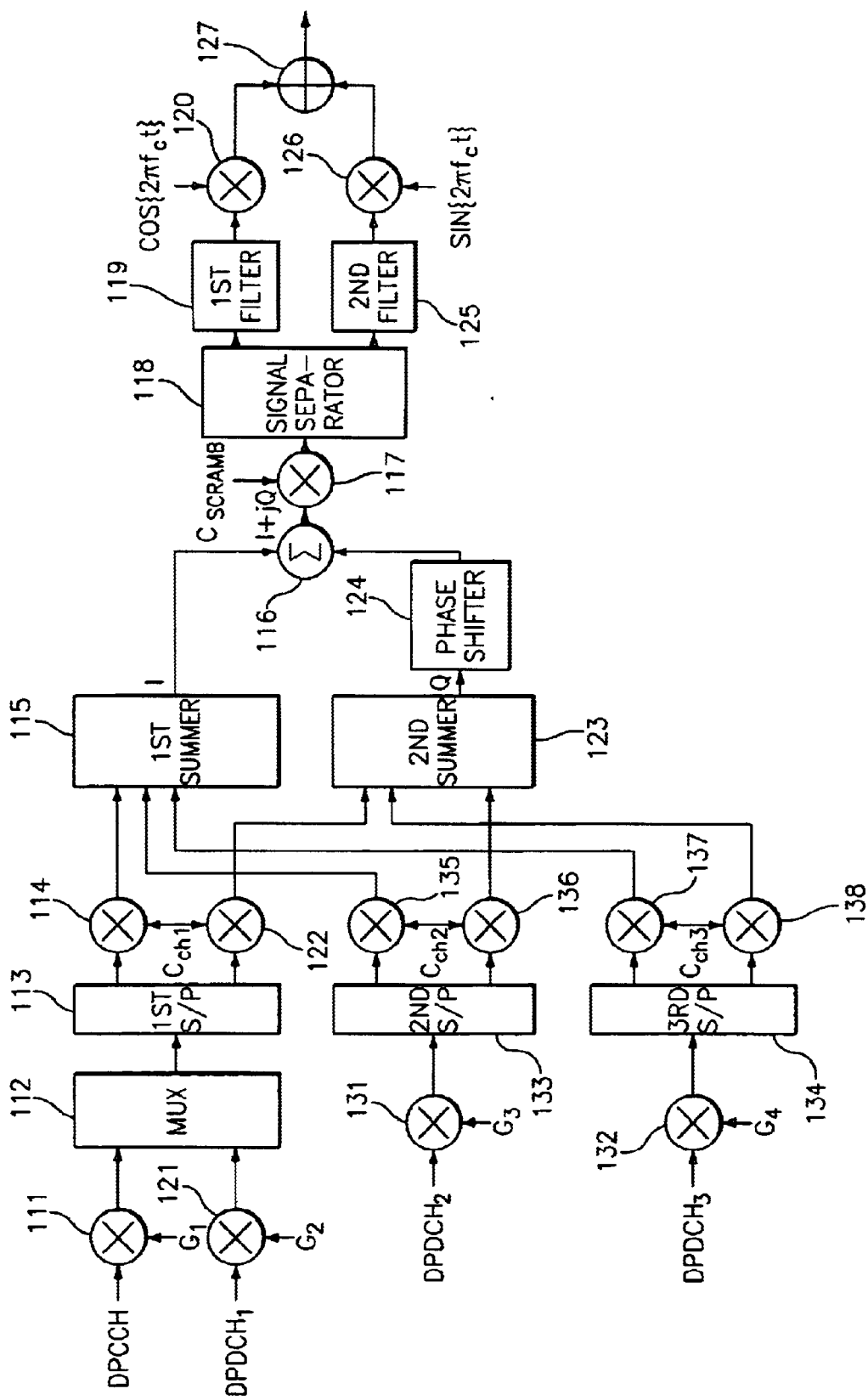
FIG. 3A is a diagram illustrating a structure of a conventional base station transmitter.
Figure 4A:
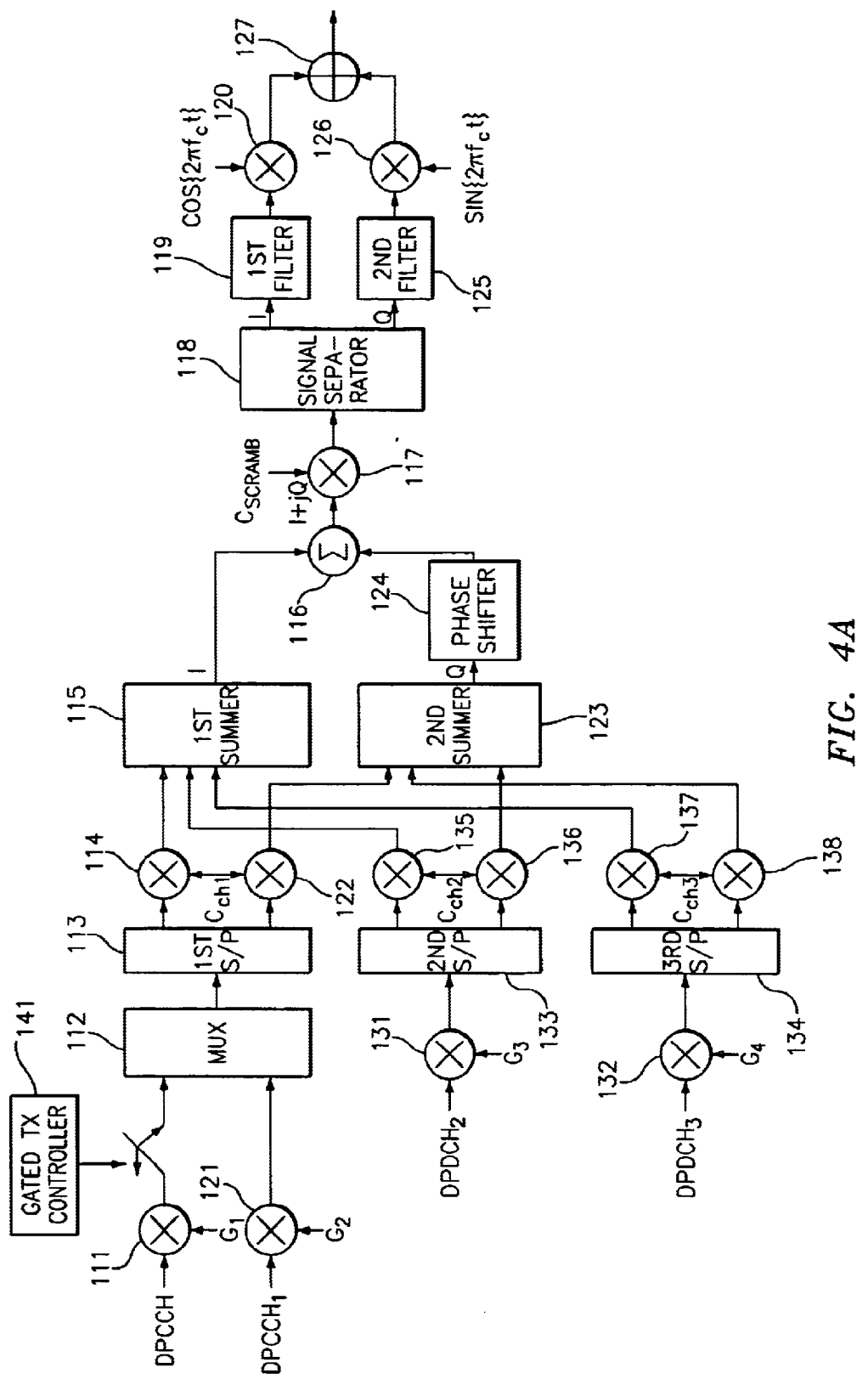
FIG. 4A is a diagram illustrating a structure of a base station transmitter according to an embodiment of the present invention.

FIG. 4A shows a structure of a base station transmitter according to an embodiment of the present invention. The base station transmitter is different from the conventional one of FIG. 3A in that with regard to the downlink DPCCH, the output of the multiplier 111 is gated by a gated transmission controller 141. That is, the gated transmission controller 141 performs gated transmission on the TFCI and TPC bits for the downlink DPCCH at a power control group (or time slot) scheduled with the mobile station when the traffic data is not transmitted over the downlink and uplink DPDCHs for a predetermined time. In addition, the gated transmission controller 141 performs gated transmission on one power control group (or one entire slot) including the pilot symbols, TFCI and TPC bits for the downlink DPCCH at a power control group (or time slot) scheduled with the mobile station when the traffic data is not transmitted over the downlink and uplink DPDCHs for a predetermined time.

Although the downlink gated transmission pattern is identical to the uplink gated transmission pattern, an offset may exist between them for efficient power control. The offset is given as a system parameter.

The gated transmission controller 141 can perform gated transmission either when the gated transmission unit is identical to the slot unit or when the gated transmission unit is not identical to the slot unit. When the gated transmission unit is not identical to the slot unit, the gated transmission controller 141 separately gates the TFCI, TPC and pilot symbols. That is, the pilot symbol in the predetermined nth slot, and the TFCI and TPC in the (n+1)th slot are set as a gated transmission unit.

In addition, the gated transmission controller 141 locates the TPC bits for power controlling the first slot of the next frame at the last slot of one frame to guarantee performance of the beginning part of the next frame. That is, the TPC bits for the downlink DPCCH and the uplink DPCCH are located at the last slot of the nth frame, and power of the first slot of the (n+1)th frame is controlled using the TPC bits existing at the last slot of the nth frame.

Figure 3B:
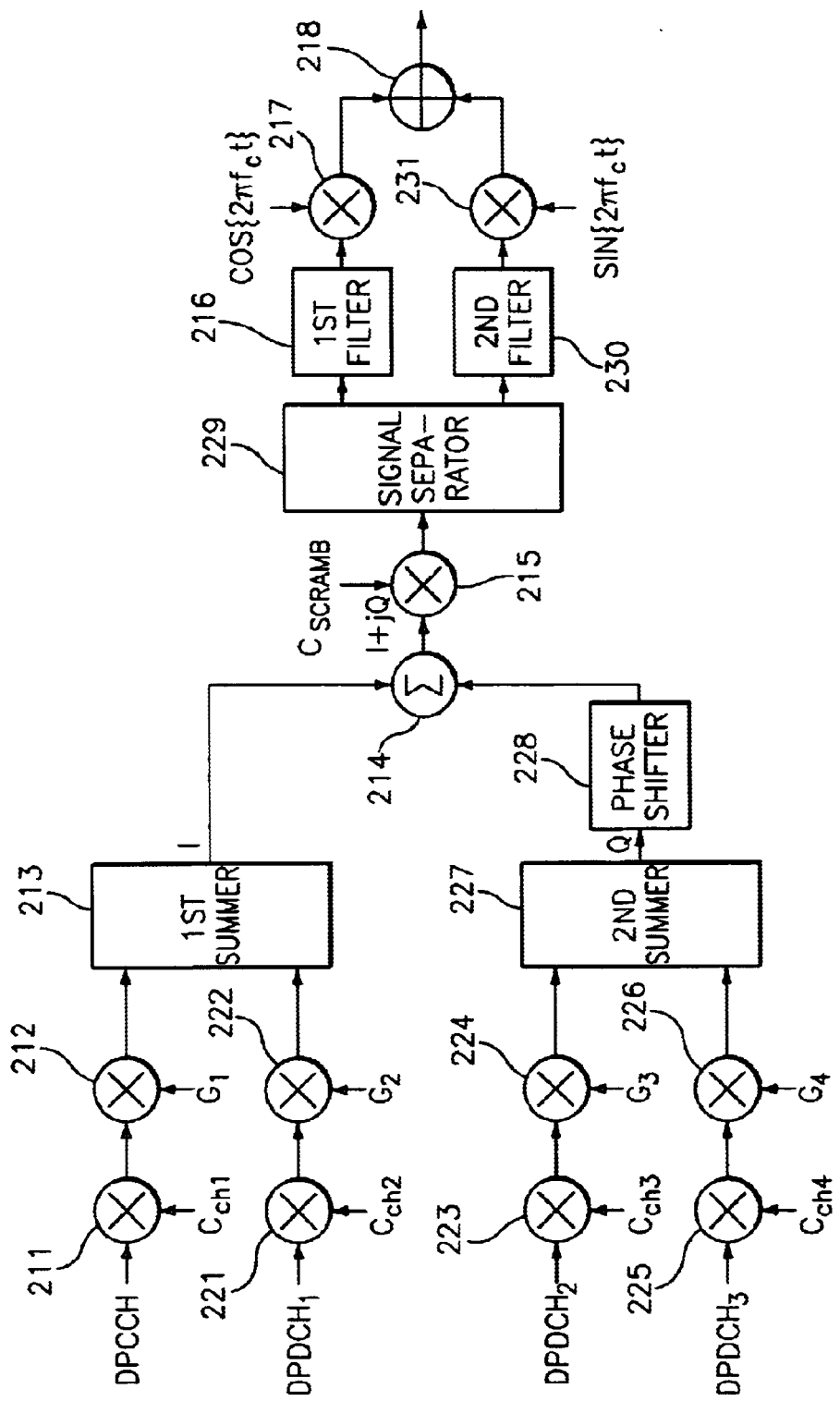
FIG. 3B is a diagram illustrating a structure of a conventional mobile station transmitter.
Figure 4B:
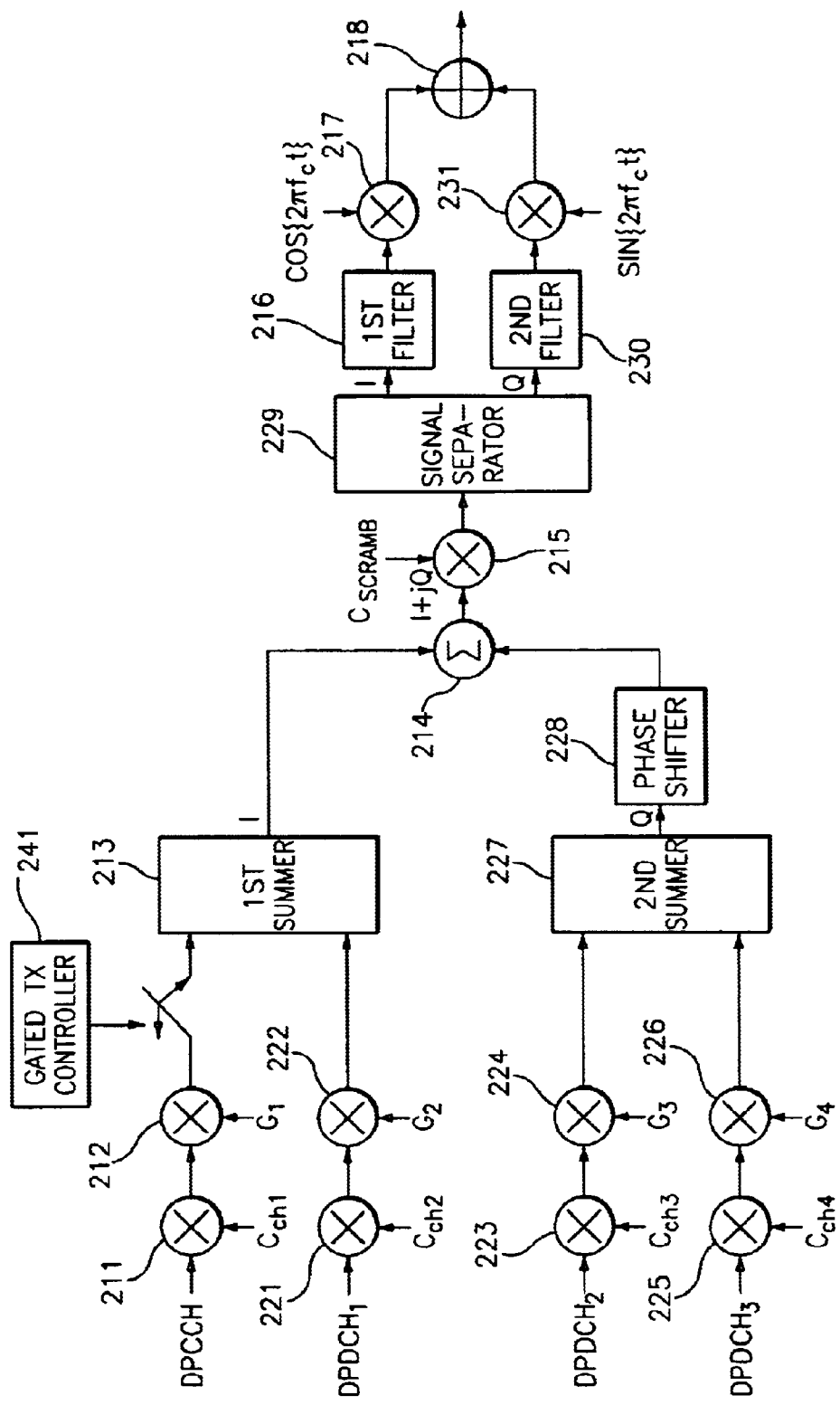
FIG. 4B is a diagram illustrating a structure of a mobile station transmitter according to an embodiment of the present invention.
Figure 5A:
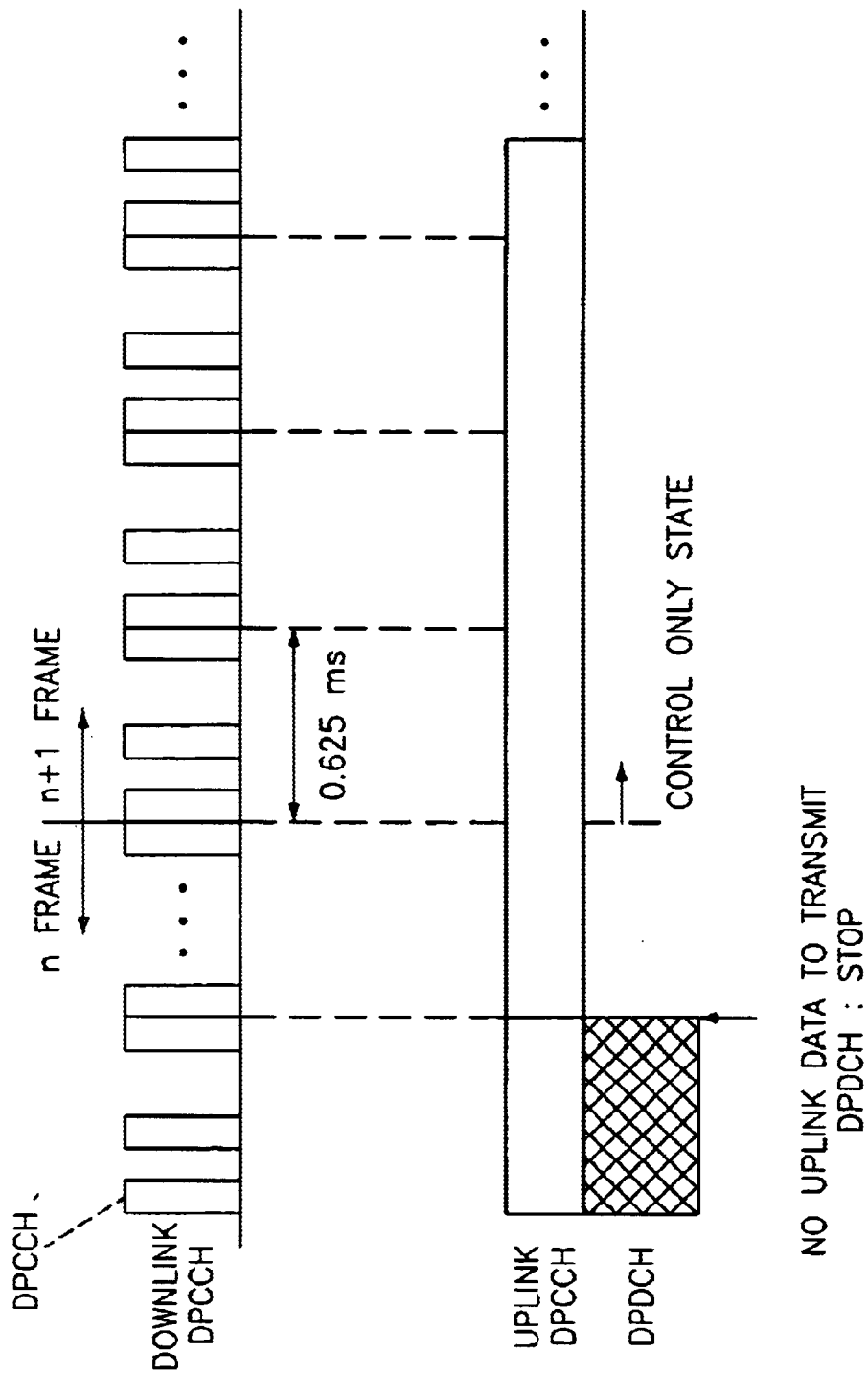
FIG. 5A is a diagram for explaining how to transmit a downlink DPCCH and a uplink DPCCH when transmission of a uplink DPDCH is discontinued in a conventional control-only substate.
Figure 5B:
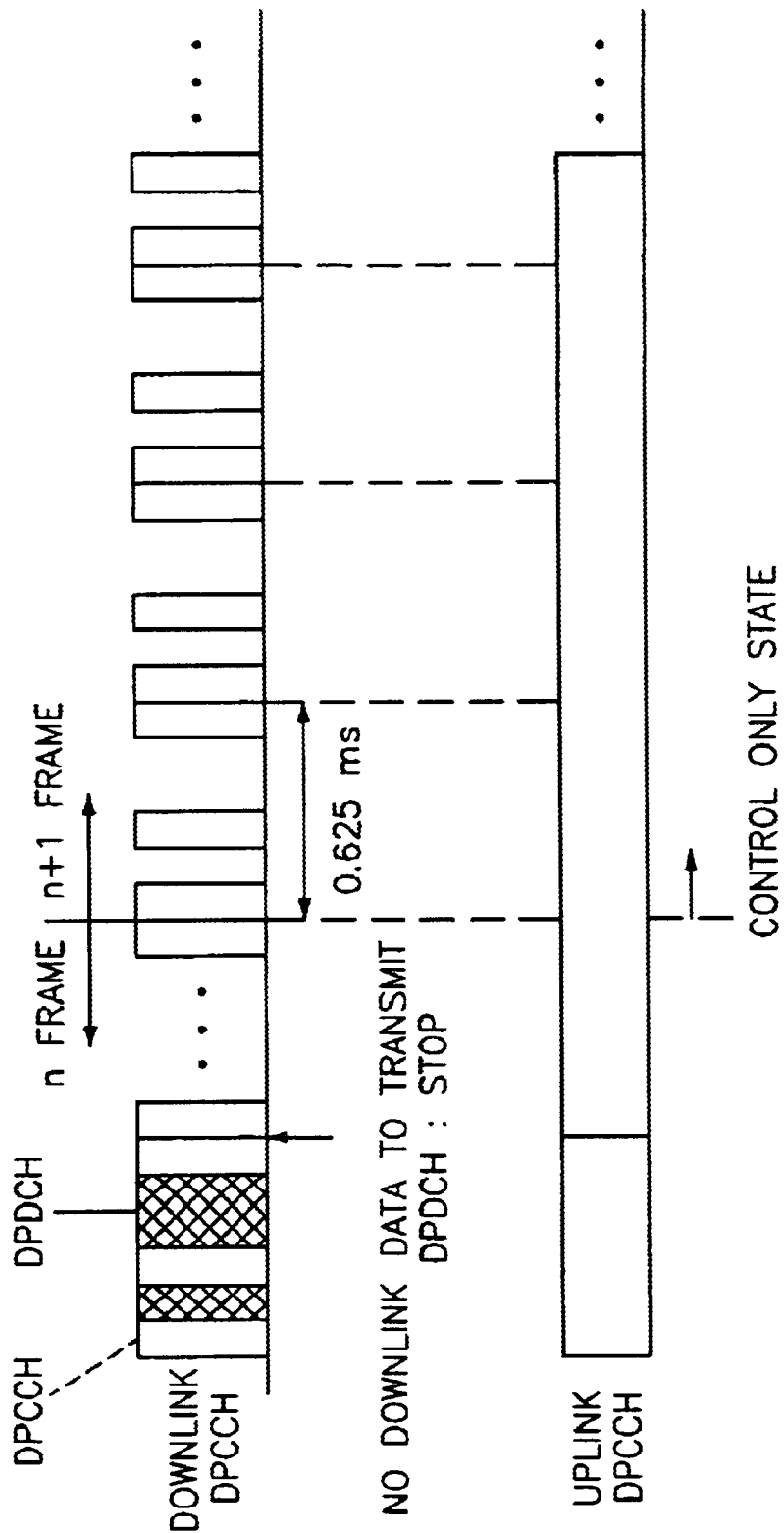
FIG. 5B is a diagram for explaining how to transmit a downlink DPCCH and a uplink DPCCH when transmission of a downlink DPDCH is discontinued in the conventional control-only substate.

FIG. 4B shows a structure of a mobile station transmitter according to an embodiment of the present invention. The mobile station transmitter is different from the conventional one of FIG. 3B in that a gated transmission controller 241 is provided to gate transmission of the uplink DPCCH. That is, the gated transmission controller 241 performs gated transmission on one power control group (or one entire slot) including the pilot symbols, TFCI, FBI and TPC bits for the uplink DPCCH at a power control group (or time slot)

scheduled with the mobile station in the control-only substate where the traffic data is not transmitted over the downlink and uplink DPDCHs. For sync detection, it is necessary to transmit the pilot symbols and TPC bits over the uplink DPCCH, and there is no alternative way to transmit the TPC, FBI and pilot symbols over the other uplink channels at the duration where transmission of the above channel is discontinued.

Now, a description will be made of a transmission signal structure of the base station and the mobile station according to an embodiment of the present invention.

Figure 6A:
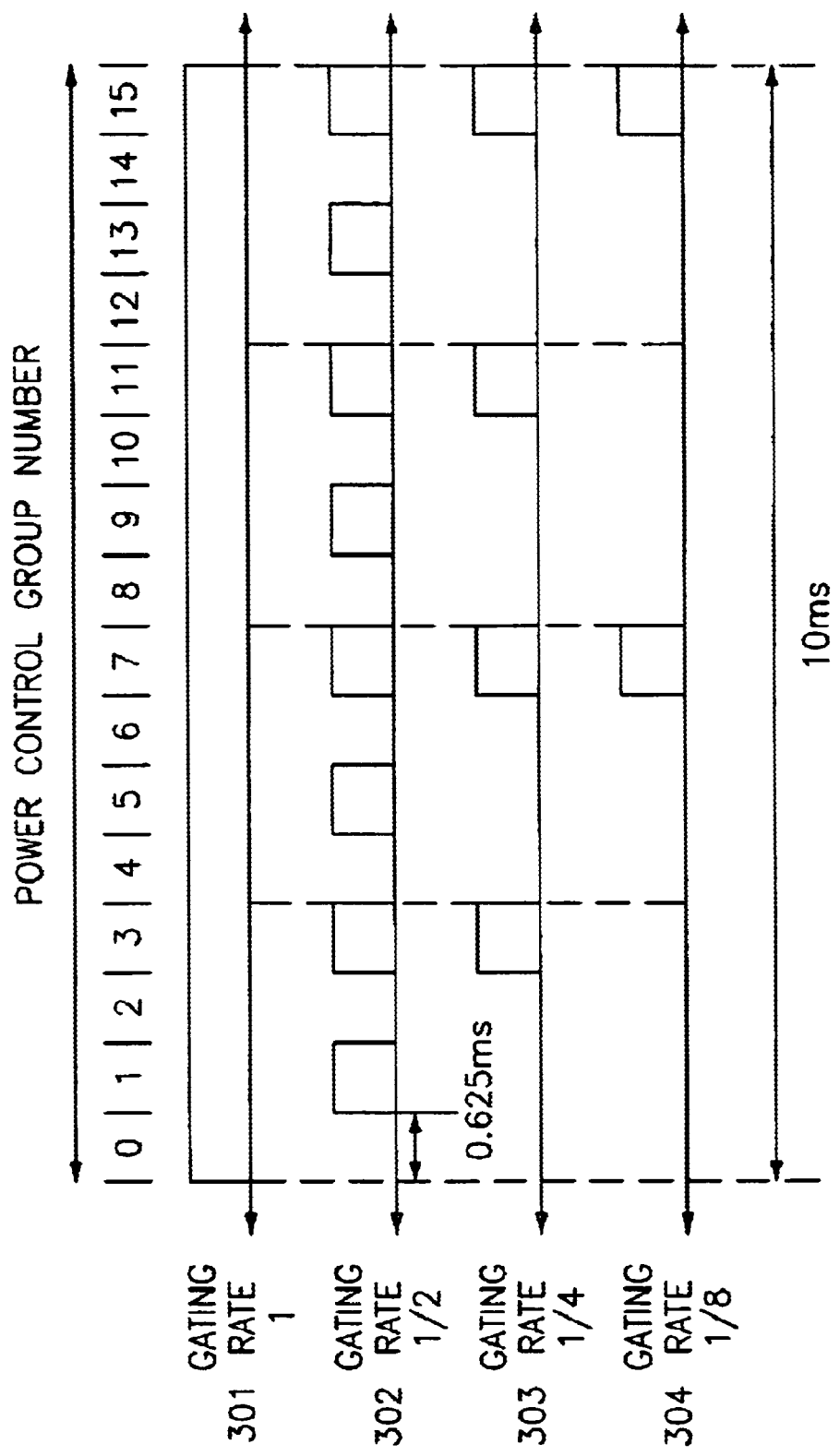
FIG. 6A is a diagram illustrating a method for transmitting a signal according to a regular or gated transmission pattern for a uplink DPCCH according to an embodiment of the invention.

FIG. 6A shows a method for transmitting a signal according to a regular or gated transmission pattern for the uplink DPCCH when there is no DPDCH data for a predetermined period of time according to an embodiment of the present invention. In FIG. 6A, reference numerals 301, 302, 303 and 304 show different gating rates according to a ratio of a duty cycle (hereinafter, referred to as DC). Reference numeral 301 shows a conventional method for transmitting the uplink DPCCH without gating (DC=1, regular transmission), and reference numeral 302 shows a method for regularly transmitting every other power control group (or time slot), when DC=½(only ½ of all the power control groups in one frame are transmitted). Reference numeral 303 shows a method for regularly transmitting every fourth power control group (3rd, 7th, 11th and 15th power control groups), when DC=¼ (only ¼ of all the power control groups in one frame are transmitted). Reference numeral 304 shows a method for regularly transmitting every eighth power control group (7th and 15th power control groups), when DC=⅛ (only ⅛ of all the power control groups in one frame are transmitted). In the embodiment of FIG. 6A, when DC=½ and ¼, although the gated transmission controller 241 of the mobile station regularly gates the power control groups of the uplink DPCCH, it is also possible to gate arbitrary power control groups out of all the standard power control groups according to the corresponding DC. That is, when DC=½, it is also possible to gate arbitrary power control groups according to an irregular pattern, rather than to regularly transmit every other power control group. Further, when DC=½, it is also possible to continuously transmit half of all the power control groups at the second half (8th to 15th power control groups) of the frame. When DC=¼, it is also possible to continuously transmit ¼ of all the power control groups beginning at a ¾ point of the frame (i.e., 12th to 15th power control groups). When DC=⅛, it is also possible to continuously transmit ⅛ of all the power control groups beginning at a ⅞ point of the frame (i.e., 14th to 15th power control groups).

The above gating rate transition method can be divided into several methods as stated below, and is determined according to system setup. In one method, a direct gating rate transition occurs from DC=1/1 to DC=½, from DC=1/1 to DC=¼, or from DC=1/1 to DC=⅛ according to a set timer value or a transition command message from the base station. In another method, a sequential gating rate transition occurs from DC=1/1 to DC=½, from DC=½ to DC=¼, or from DC=¼ to ⅛. Selection of the DC value can be determined in consideration of the capacity of the corresponding mobile station or the quality of the channel environment.

Figure 6B:
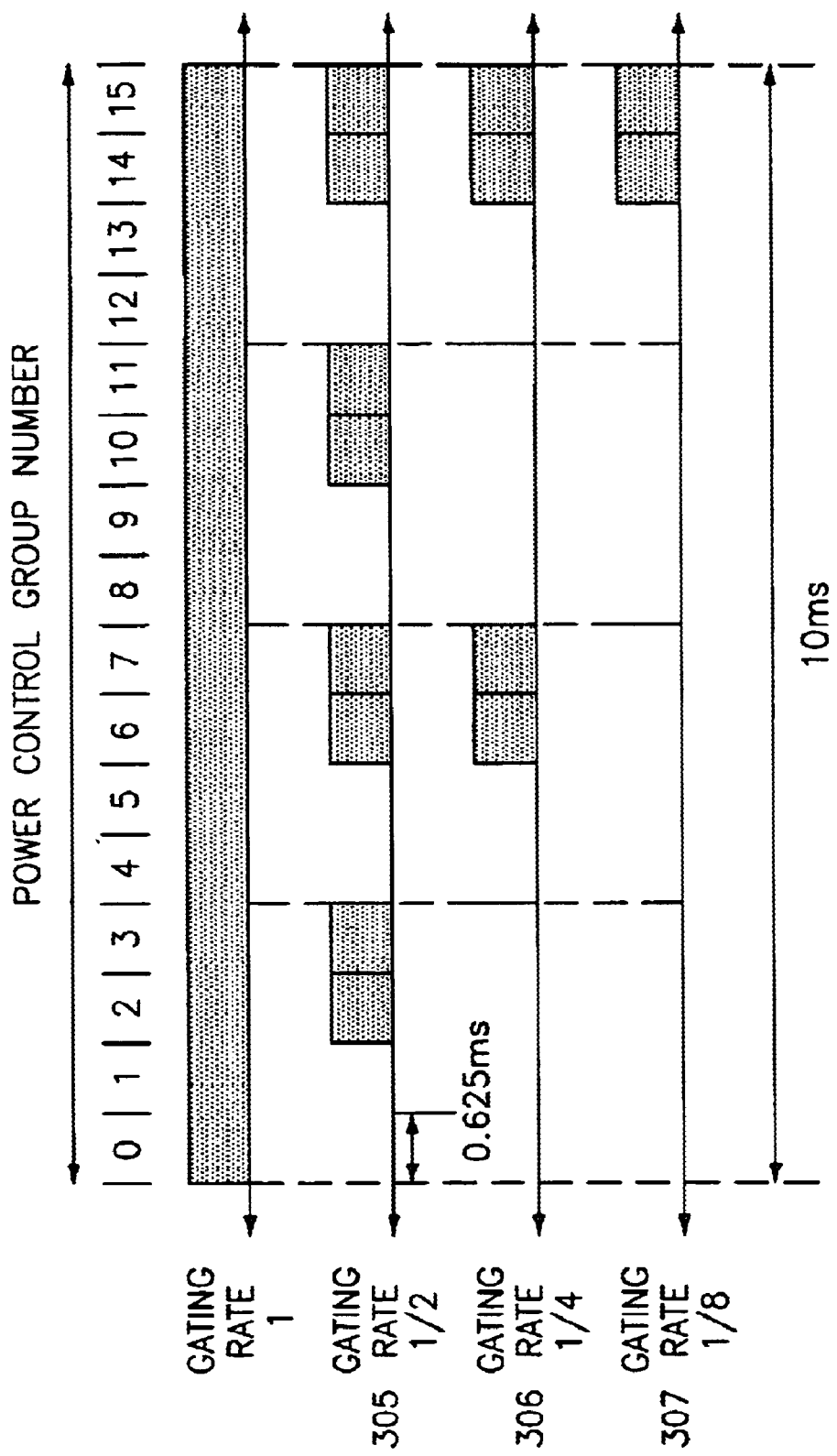
FIG. 6B is a diagram illustrating another method for transmitting a signal according to a regular or gated transmission pattern for a uplink DPCCH according to an embodiment of the invention.

FIG. 6B shows a method for transmitting a signal according to a regular or gated transmission pattern for the uplink DPCCH when there is no DPDCH data for a predetermined period of time according to another embodiment of the present invention. In FIG. 6B, reference numerals 305, 306 and 307 show different gating rates according to a ratio of a duty cycle DC. Reference numeral 305 shows a method for transmitting two consecutive power control groups at regular locations ($2^{nd}$–$3^{rd}$, $6^{th}$–$7^{th}$, $10^{th}$–$11^{th}$ and $14^{th}$–$15^{th}$ power control groups), when DC=½ (only ½ of all the power control groups in one frame are transmitted). Reference numeral 306 shows a method for transmitting two consecutive power control groups at regular locations ($6^{th}$–$7^{th}$ and $14^{th}$–$15^{th}$ power control groups), when DC=¼ (only ¼ of all the power control groups in one frame are transmitted). Reference numeral 307 shows a method for transmitting two consecutive power control groups at regular locations ($14^{th}$–$15^{th}$ power control groups), when DC=⅛ (only ⅛ of all the power control groups in one frame are transmitted). In the embodiment of FIG. 6B, when DC=½ and ¼, although the gated transmission controller 241 of the mobile station regularly gates the power control groups of the uplink DPCCH, it is also possible to gate arbitrary power control groups out of all the power control groups according to the corresponding DC. That is, when DC=½, it is also possible to continuously gate 4 consecutive power control groups (e.g., $2^{nd}$–$5^{th}$ power control groups) according to an irregular pattern, rather than to regularly transmit every other 2 consecutive power control groups.

The above gating rate transition method can be divided into several methods as stated below, and is determined according to system setup. In one method, a direct state transition occurs from DC=1/1 (full rate) to DC=½, from DC=1/1 to DC=¼, or from DC=1/1 to DC=⅛ according to a set timer value or a transition command message from the base station. In another method, a sequential gating rate transition occurs from DC=1/1 to DC=½, from DC=½ to DC=¼, or from DC=¼ to ⅛. Selection of the DC value can be determined in consideration of the capacity of the corresponding mobile station or the quality of the channel environment.

Figure 7A:
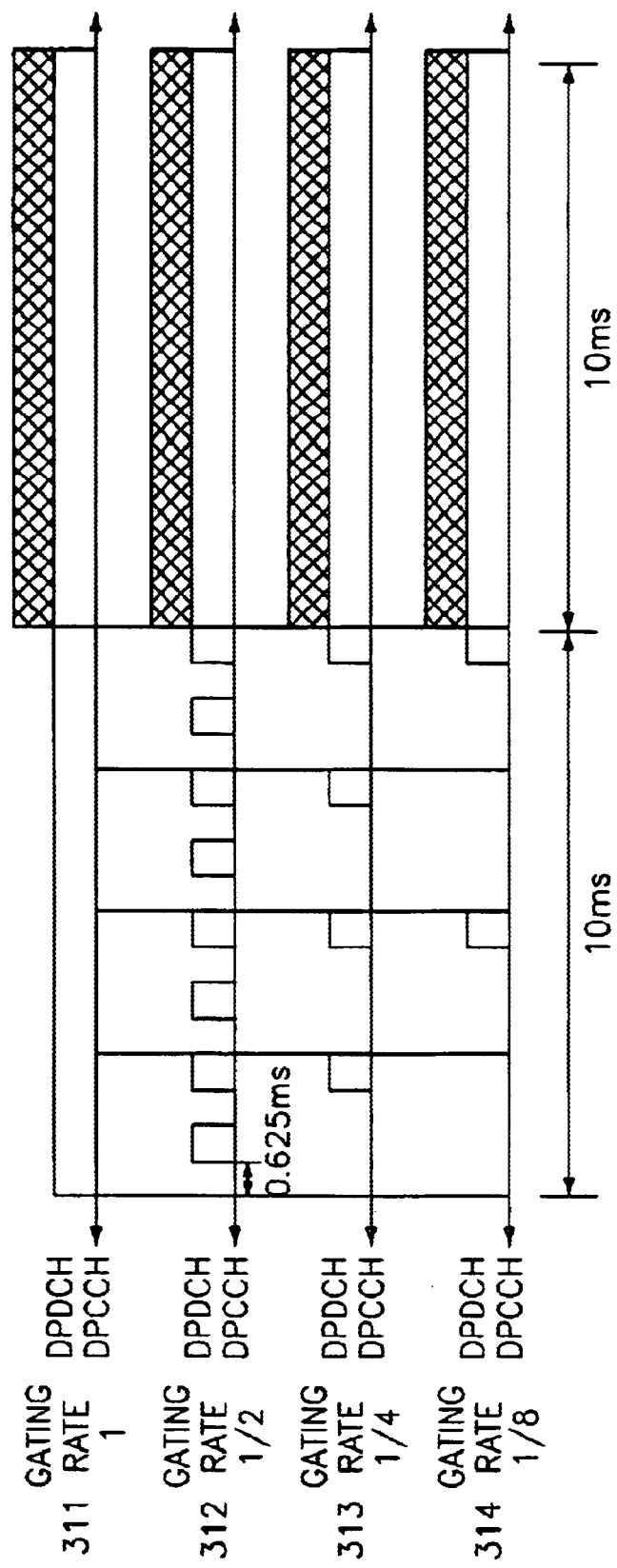
FIG. 7A is a diagram illustrating a method for transmitting a signal when a uplink DPDCH message is generated while a uplink DPCCH is intermittently transmitted in a gating mode according to an embodiment of the invention.
Figure 7B:
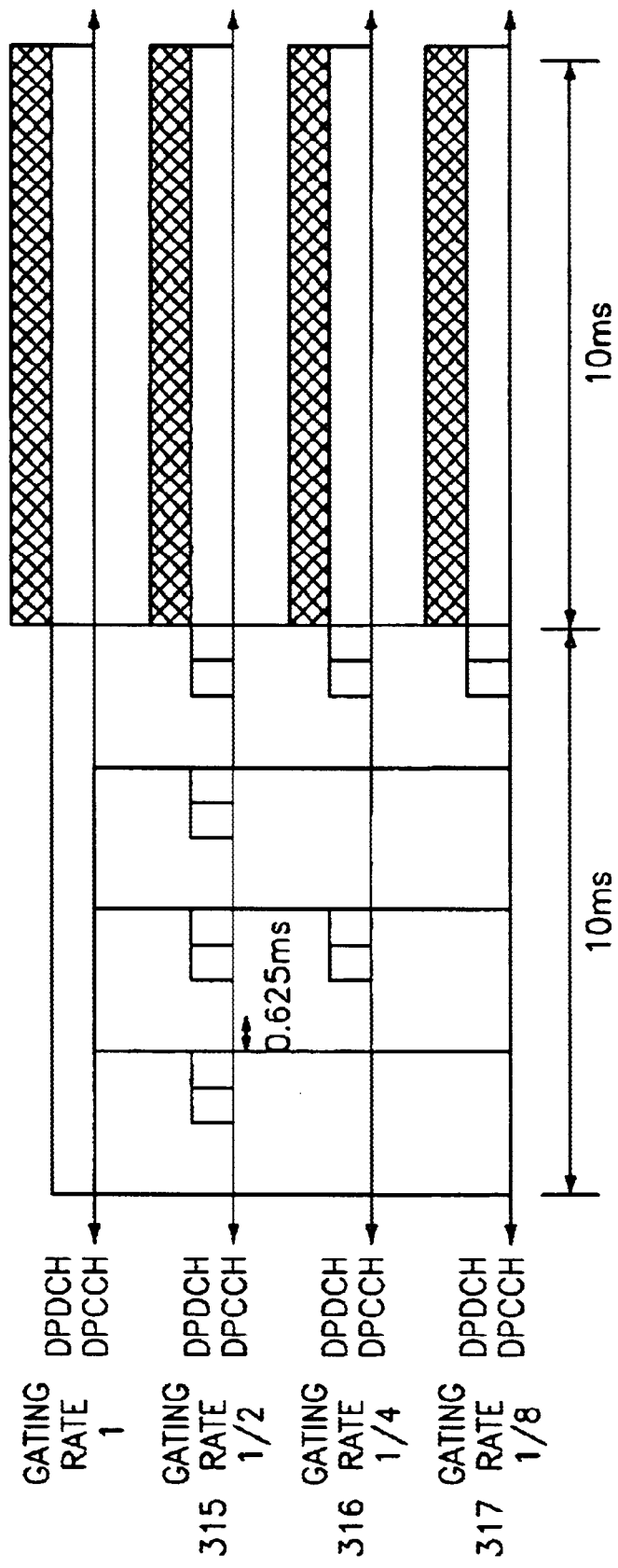
FIG. 7B is a diagram illustrating another method for transmitting a signal when a uplink DPDCH message is generated while a uplink DPCCH is intermittently transmitted in a gating mode according to an embodiment of the invention.

FIGS. 7A and 7B show the uplink DPCCH for the case where a transition message is transmitted over the uplink DPDCH when a dedicated MAC (Medium Access Control) logical channel is generated when there is no DPDCH data for a predetermined period of time of FIGS. 6A and 6B. Reference numeral 311 of FIG. 7A shows a case where a uplink DPDCH message is generated while the uplink DPCCH does not undergo gated transmission (i.e., while the uplink DPCCH is continuously transmitted (DC=1/1)). Reference numeral 312 shows a case where the uplink DPDCH message is generated while the uplink DPCCH undergoes DC=½ gated transmission. Reference numeral 313 shows a case where the uplink DPDCH message is generated while the uplink DPCCH undergoes DC=¼ gated transmission. Reference numeral 314 shows a case where the uplink DPDCH message is generated while the uplink DPCCH undergoes DC=⅛ gated transmission.

The power control groups, as shown by the reference numerals 312, 313 and 314, are transmitted according to the gated transmission patterns in the first frame, and then undergo normal transmission when the uplink DPDCH is transmitted in the second frame. In the power control groups for normal transmission, the TPC bits for downlink power control can be omitted and the pilot duration (or period) can be extended to a power control group length. Beginning at the power control groups succeeding after transmitting the uplink DPDCH message by normal transmission of the power control groups, it is possible to transmit the uplink DPCCH without gating, or it is possible to gate transmission of the uplink DPCCH according to the original DC value until a gating rate transition message is received from the base station. That is, when the uplink DPDCH message is transmitted for DC=½ gated transmission, it is possible to perform normal transmission on the power control group of the above duration, thereafter perform DC=½ gated transmission again, and then perform DC=1 (regular transmission) gated transmission when DPDCH user data exists.

Like the uplink DPCCH, even in the downlink, when a downlink DPDCH message is generated during gated transmission for the DPCCH, the power control groups, which are transmitted according to the gated transmission pattern, undergo normal transmission to transmit the downlink DPDCH. In the power control groups for normal transmission, the TPC bits for downlink power control can be omitted and the pilot duration can be extended to a power control group length. Beginning at the power control groups succeeding after transmitting the downlink DPDCH message by normal transmission of the power control groups, it is possible to transmit the downlink DPCCH without gating, or it is possible to gate transmission of the downlink DPCCH according to the original DC value until a state transition request message is received from the mobile station. That is, when the downlink DPDCH message is transmitted for DC=½ gated transmission, it is possible to perform normal transmission on the power control group of the above duration, thereafter perform DC=½ gated transmission again, and then perform DC=1 gated transmission when transmitting the DPDCH user data.

Reference numeral 315 of FIG. 7B shows a case where a uplink DPDCH message is generated while the uplink DPCCH undergoes DC=½ gated transmission. Reference numeral 316 shows a case where the uplink DPDCH message is generated while the uplink DPCCH undergoes DC=¼ gated transmission. Reference numeral 317 shows a case where the uplink DPDCH message is generated while the uplink DPCCH undergoes DC=⅛ gated transmission. The power control groups, as shown by the reference numerals 315, 316 and 317, are transmitted according to the gated transmission patterns, and then undergo normal transmission to transmit the downlink DPDCH message. In the power control groups for normal transmission, the TPC bits for downlink power control can be omitted and the pilot duration (or period) can be extended to a power control group length. Beginning at the power control groups succeeding after transmitting the uplink DPDCH message by normal transmission of the power control groups, it is possible to transmit the uplink DPCCH without gating, or it is possible to gate transmission of the uplink DPCCH according to the original DC value until a state transition message is received from the base station. That is, when the uplink DPDCH message is transmitted for DC=½ gated transmission, it is possible to perform normal transmission on the power control group of the above duration, thereafter perform DC=½ gated transmission again, and then perform DC=1 gated transmission when transmitting the DPDCH user data.

It is also possible to simultaneously gate transmission of both the uplink DPCCH and the downlink DPCCH according to the same gating pattern. Beginning at the power control groups succeeding after transmitting the downlink DPDCH message by normal transmission of the power control groups, generated while gating transmission of the downlink DPCCH, it is possible to transmit the downlink DPCCH without gating, or it is possible to gate transmission of the downlink DPCCH according to the original DC value until a state transition request message is received from the mobile station. That is, when the downlink DPDCH message is transmitted for DC=½ gated transmission, it is possible to perform normal transmission on the power control group of the above duration, thereafter perform DC=½ gated transmission again, and then perform DC=1 gated transmission when transmitting the DPDCH user data.

Figure 8A:
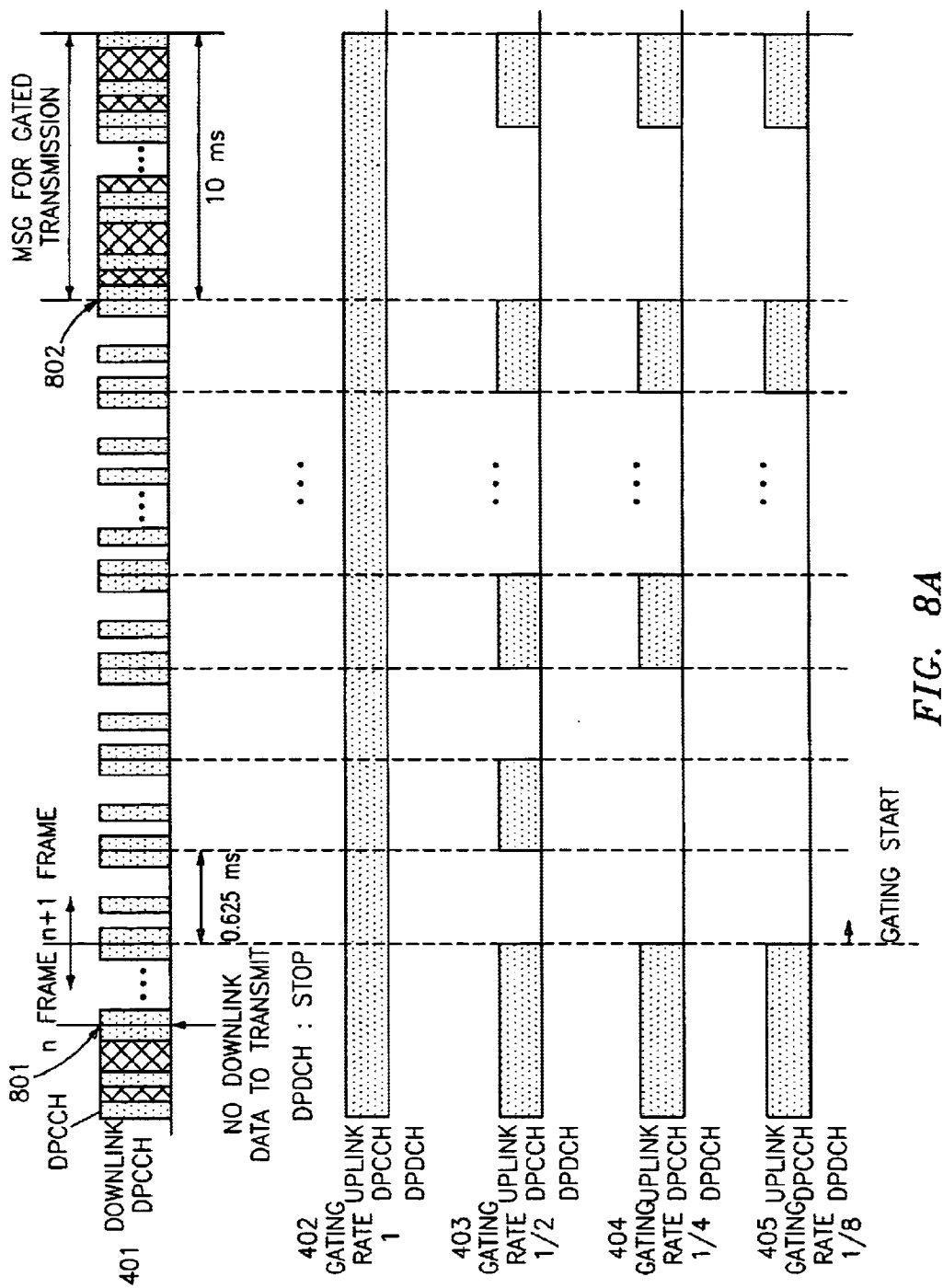
FIG. 8A is a diagram illustrating a method for transmitting downlink and uplink signals when transmission of a downlink DPDCH is discontinued according to an embodiment of the present invention.

FIG. 8A shows a method for transmitting downlink and uplink signals when transmission of a downlink DPDCH is discontinued. When transmission of the downlink DPDCH is discontinued as shown by reference numeral 801 in the user data active substate where there exists no uplink DPDCH, the base station and the mobile station start gating transmission if a set timer value expires or a downlink DPDCH message for state transition is generated. Although FIG. 8A shows an embodiment where the message to start gating transmission is generated by the base station, it is also possible for the mobile station to send a gating-request message to the base station when there is no downlink and uplink DPDCH. While transmitting the downlink DPCCH in FIG. 8A, it is also possible to transmit all the TFCI, TPC and pilot symbols without gating. Since the TPC bits include meaningless TPC values determined by measuring power strength of the pilot symbols of the gated power control groups within the uplink DPCCH, the mobile station ignores the meaningless TPC values transmitted from the base station in order to perform uplink power control in consideration of the gating pattern for the uplink DPCCH, and performs transmission at the same transmission power as the transmission power for the previous power control group. Alternatively, while transmitting the downlink DPCCH in FIG. 8A, it is also possible to gate only the TFCI and TPC bits in the downlink DPCCH without gating the pilot symbols in the downlink DPCCH. At this point, the gating pattern is identical to a gating pattern for the uplink DPCCH of the mobile station. The power control group, in which the TPC bits in the downlink DPCCH are gated, refers to the TPC bits generated by measuring the pilot symbols corresponding to the gated power control group in the DPCCH transmitted from the mobile station. Reference numeral 802 shows a situation where a message to stop gated transmission is generated by the base station and is transmitted to the mobile station over the downlink DPDCH. In this case, the mobile station, which has been gating transmission of the uplink DPCCH, can stop gated transmission upon receipt of the message to stop gated transmission and perform normal transmission (DC=1) when uplink DPDCH data should be transmitted. Alternatively, the mobile station, which has been gating transmission of the uplink DPCCH, can continue gated transmission even after receipt of the message to stop the gated transmission, stop gated transmission at the stop time included in the gated transmission stop message, and then perform normal transmission (DC=1).

Figure 8B:
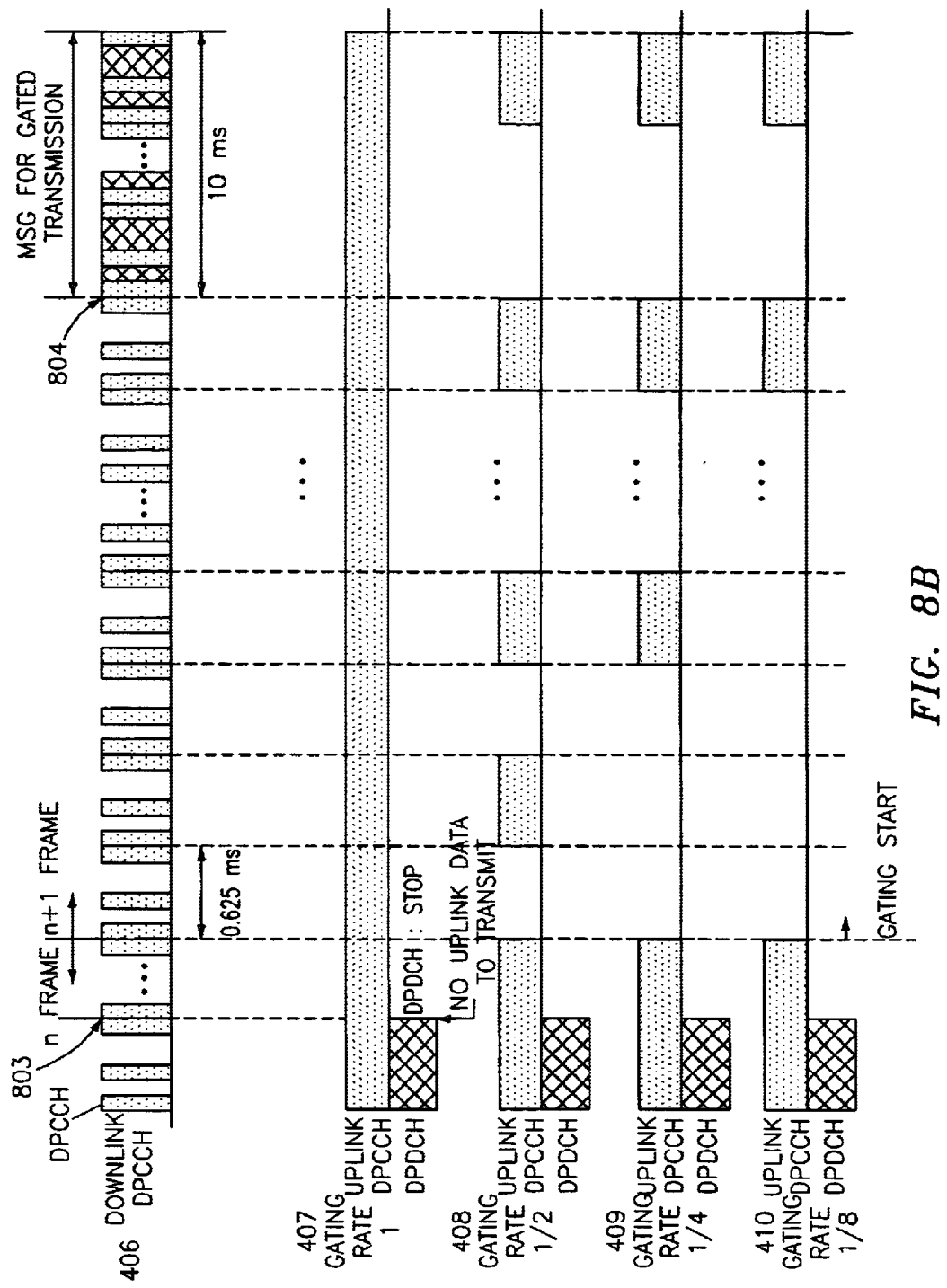
FIG. 8B is a diagram illustrating a method for transmitting downlink and uplink signals when transmission of a uplink DPDCH is discontinued according to an embodiment of the present invention.

FIG. 8B shows a method for transmitting downlink and uplink signals when transmission of a uplink DPDCH is discontinued. When transmission of the uplink DPDCH is discontinued as shown by reference numeral 803 in the user data active substate where there exists no downlink DPDCH, the base station and the mobile station make the gated transmission at a time point appointed (or scheduled) between them when a set timer value expires or after exchanging a gated transmission message. Although FIG. 8B shows an embodiment where the message for gated transmission is generated in the downlink DPDCH, the gated transmission message can also be generated in the uplink DPDCH of the mobile station. While transmitting the downlink DPCCH in FIG. 8B, it is also possible to transmit all the TFCI, TPC and pilot symbols without gating. Since the TPC bits include meaningless TPC values determined by measuring power strength of the pilot symbols of the gated power control groups within the uplink DPCCH, the mobile station ignores the meaningless TPC values transmitted from the base station in order to perform uplink power control in consideration of the gating pattern for the uplink DPCCH, and performs transmission at the same transmission power as the transmission power for the previous power control group. Alternatively, while transmitting the downlink DPCCH in FIG. 8B, it is also possible to gate only the TFCI and TPC bits in the downlink DPCCH without gating the pilot symbols in the downlink DPCCH. At this point, the gating pattern is identical to a gating pattern for the uplink DPCCH of the mobile station. The power control group, in which the TPC bits in the downlink DPCCH are gated, refers to the TPC bits generated by measuring the pilot symbols corresponding to the gated power control group in the DPCCH transmitted from the mobile station.

Reference numeral 804 shows a situation where a stop gated transmission message generated by the base station is transmitted to the mobile station over the downlink DPDCH. In this case, the mobile station, which has been gating transmission of the uplink DPCCH, can stop gated transmission upon receipt of the message to stop gated transmission and perform normal transmission (DC=1). Alternatively, the mobile station, which has been gating transmission of the uplink DPCCH, can continue gated transmission even after receipt of the message to stop gated transmission, stop gated transmission at the stop time included in the gated transmission stop message, and then perform normal transmission (DC=1).

Figure 8C:
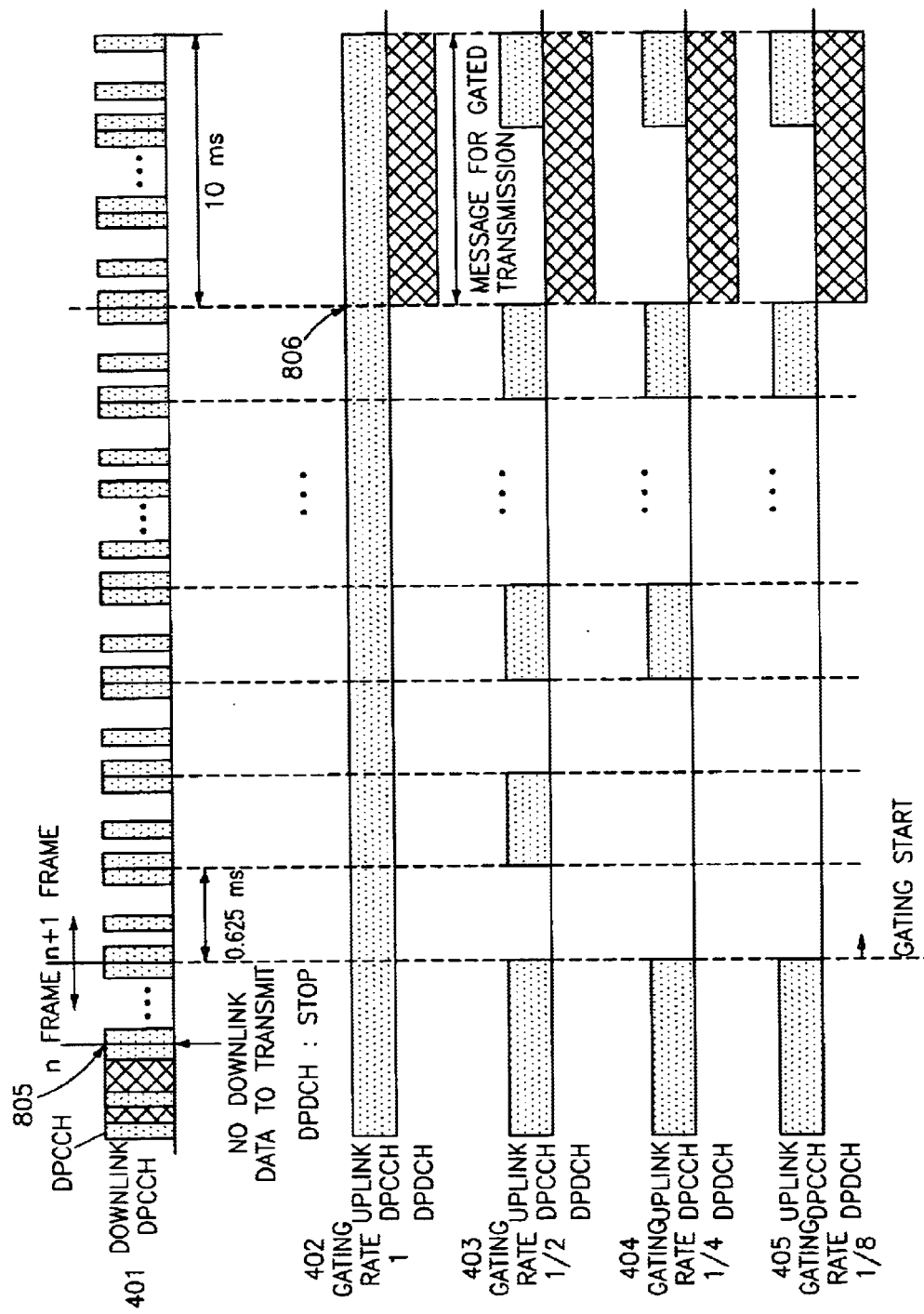
FIG. 8C is a diagram illustrating another method for transmitting downlink and uplink signals when transmission of the downlink DPDCH is discontinued according to an embodiment of the present invention.

FIG. 8C shows a method for transmitting downlink and uplink signals when transmission of a downlink DPDCH is discontinued. When transmission of the downlink DPDCH is discontinued as shown by reference numeral 805 in the user data active substate where there exists no uplink DPDCH, the base station and the mobile station start gated transmission if a set timer value expires or a start gated DPDCH message for start gated transmission is transmitted. Although FIG. 8C shows an embodiment where the message to start gated transmission message is generated by the base station, it is also possible for the mobile station to send a gated transmission request message to the base station when there is no downlink and uplink DPDCH. While transmitting the downlink DPCCH in FIG. 8C, it is also possible to transmit all the TFCI, TPC and pilot symbols without gating. Since the TPC bits include meaningless TPC values determined by measuring the power strength of the pilot symbols of the gated power control groups within the uplink DPCCH, the mobile station ignores the meaningless TPC values transmitted from the base station in order to perform uplink power control in consideration of the gating pattern for the uplink DPCCH, and performs transmission at the same transmission power as the transmission power for the previous power control group. Alternatively, while transmitting the downlink DPCCH in FIG. 8C, it is also possible to gate only the TFCI and TPC bits in the downlink DPCCH without gating the pilot symbols in the downlink DPCCH. At this point, the gating pattern is identical to a gating pattern for the uplink DPCCH of the mobile station. The power control group, in which the TPC bits in the downlink DPCCH are gated, refers to the TPC bits generated by measuring the pilot symbols corresponding to the gated power control group in the DPCCH transmitted from the mobile station.

Reference numeral 806 shows a situation where a stop gated transmission message is generated by the mobile station and is transmitted to the base station over the uplink DPDCH. In this case, the mobile station, which has been gating transmission of the uplink DPCCH, can stop gated transmission after transmission of the gated transmission stop message over the uplink DPDCH and then perform normal transmission (DC=1). Alternatively, the mobile station, which has been gating transmission of the uplink DPCCH, can continue gated transmission even after receiving gated transmission stop message, stop gated transmission at the stop time included in the gated transmission stop message, and then perform normal transmission (DC=1).

Figure 8D:
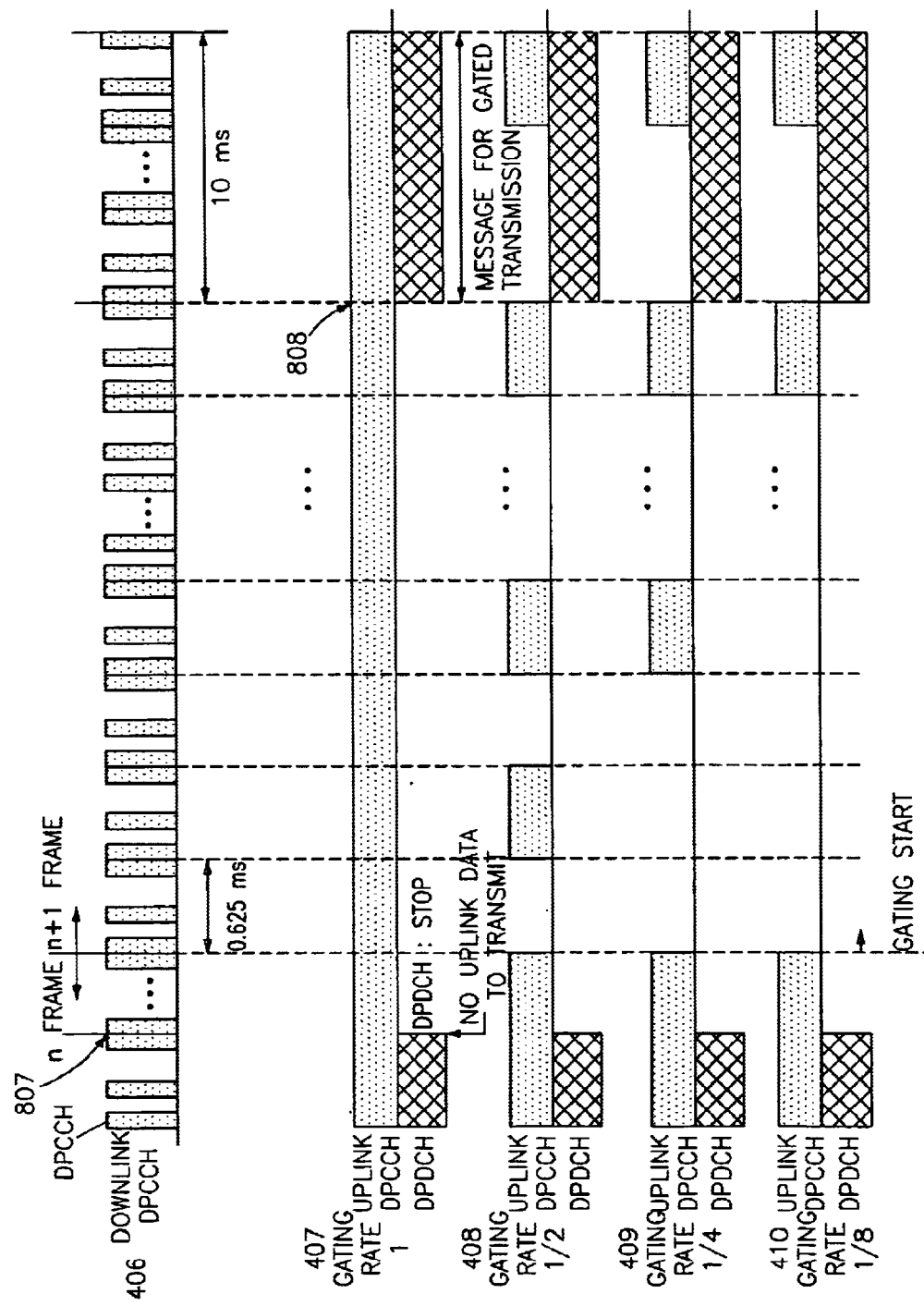
FIG. 8D is a diagram illustrating another method for transmitting downlink and uplink signals when transmission of the uplink DPDCH is discontinued according to an embodiment of the present invention.

FIG. 8D shows a method for transmitting downlink and uplink signals when transmission of a uplink DPDCH is discontinued. When transmission of the uplink DPDCH is discontinued as shown by reference numeral 807 in the user data active substate where there exists no downlink DPDCH for a predetermined period of time, the base station and the mobile station can start gated transmission at a time point appointed (or scheduled) between them when a set timer value expires or after exchanging a gated transmission message. Although FIG. 8D shows an embodiment where the message for gated transmission is generated in the downlink DPDCH, the gated transmission message can also be generated in the uplink DPDCH of the mobile station. While transmitting the downlink DPCCH in FIG. 8D, it is also possible to transmit all the TFCI, TPC and pilot symbols without gating. Since the TPC bits include meaningless TPC values determined by measuring power strength of the pilot symbols of the gated power control groups within the uplink DPCCH, the mobile station ignores the meaningless TPC values transmitted from the base station in order to perform uplink power control in consideration of the gating pattern for the uplink DPCCH, and performs transmission at the same transmission power as the transmission power for the previous power control group. Alternatively, while transmitting the downlink DPCCH in FIG. 8D, it is also possible to gate only the TFCI and TPC bits in the downlink DPCCH without gating the pilot symbols in the downlink DPCCH. At this point, the gating pattern is identical to a gating pattern for the uplink DPCCH of the mobile station. The power control group, in which the TPC bits in the downlink DPCCH are gated, refers to the TPC bits generated by measuring the pilot symbols corresponding to the gated power control group in the DPCCH transmitted from the mobile station.

Reference numeral 808 shows a situation where a stop gated transmission message generated by the mobile station is transmitted to the base station over the uplink DPDCH. In this case, the mobile station, which has been gating transmission of the uplink DPCCH, can stop gated transmission after transmission of the stop gated transmission message over the uplink DPDCH and then perform normal transmission (DC=1). Alternatively, the mobile station, which has been gating transmission of the uplink DPCCH, can continue gated transmission even after transmission of the gated transmission stop message, stop gated transmission at the stop time included in the gated transmission stop message, and then perform normal transmission (DC=1).

Figure 9A:
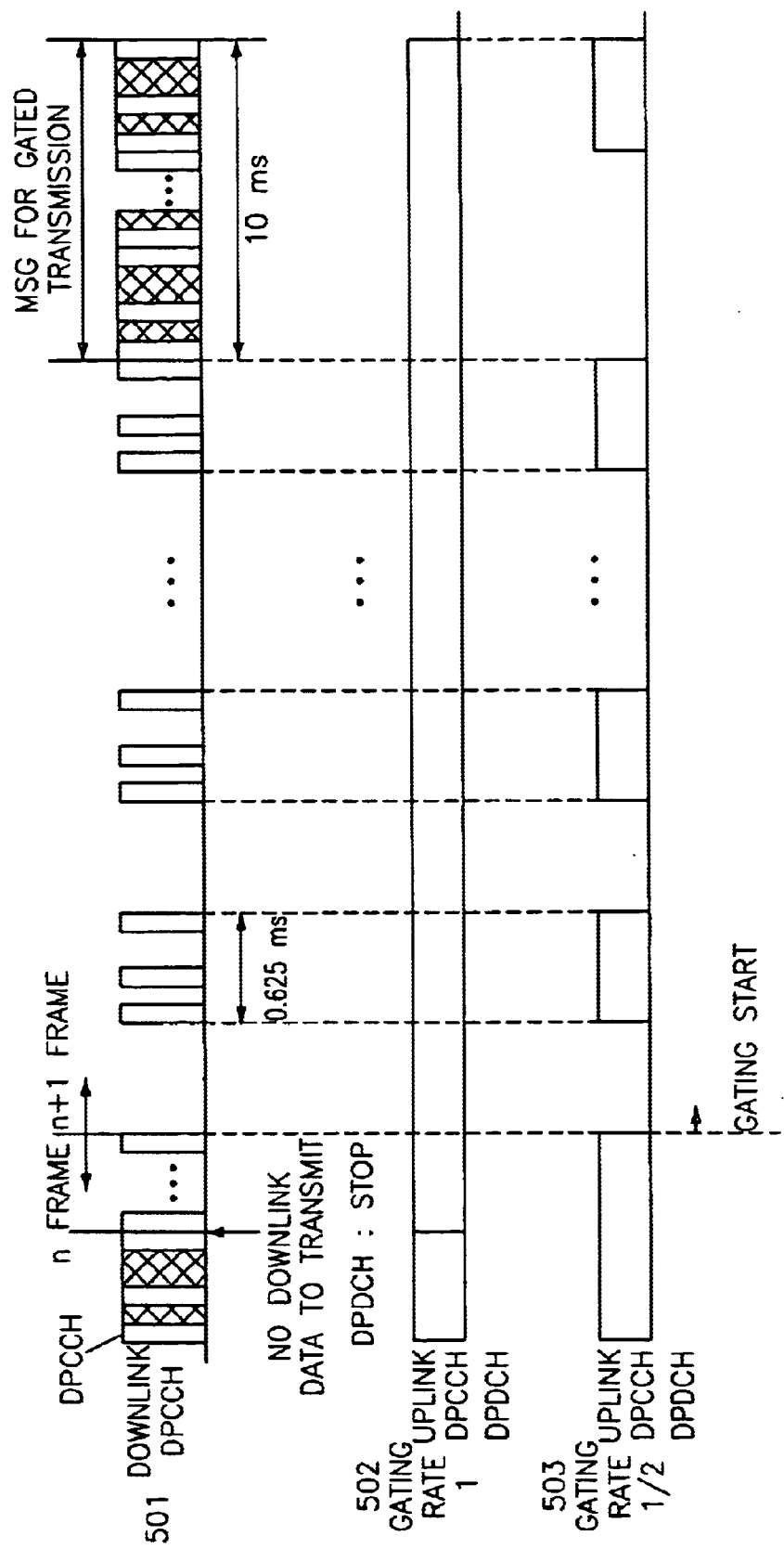
FIG. 9A is a diagram illustrating a method for transmitting downlink and uplink signals when transmission of a downlink DPDCH is discontinued (gated transmission for the downlink DPCCH) according to an embodiment of the present invention.

FIG. 9A shows a method for transmitting downlink and uplink signals when transmission of a downlink DPDCH is discontinued. When transmission of the downlink DPDCH is discontinued, the base station and the mobile station can start gated transmission at a time point appointed between them if a set timer value expires or after exchanging a gated transmission message. FIG. 9A shows a case where a gating pattern for the downlink DPCCH 501 is identical to a gating pattern for the uplink DPCCH 503. Although FIG. 9A shows an embodiment where the gated transmission message is generated through the downlink DPDCH, the gated transmission message can also be generated through the uplink DPDCH of the mobile station.

Figure 9B:
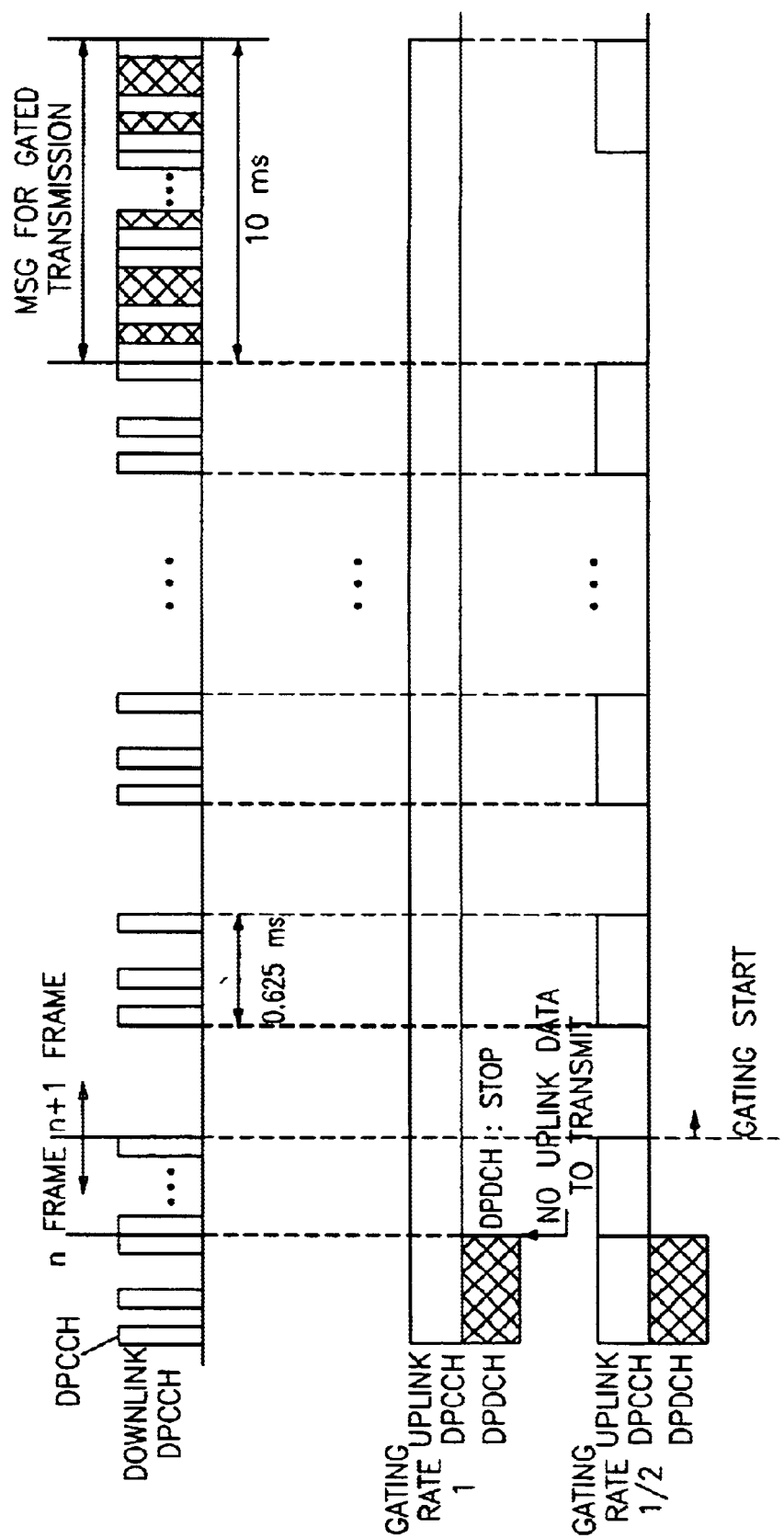
FIG. 9B is a diagram illustrating a method for transmitting downlink and uplink signals when transmission of a uplink DPDCH is discontinued (gated transmission for downlink DPCCH) according to an embodiment of the present invention.

FIG. 9B shows a method for transmitting downlink and uplink signals when transmission of a uplink DPDCH is discontinued. When transmission of the uplink DPDCH is discontinued, the base station and the mobile station make a state transition at a time point appointed between them if a set timer value expires or after exchanging a state transition message. FIG. 9B shows a case where a gating pattern for the downlink DPCCH is identical to a gating pattern for the uplink DPCCH. Although FIG. 9B shows an embodiment where the state transition message is generated through the downlink DPDCH, the state transition message can also be generated through the uplink DPDCH of the mobile station.

Figure 10A:
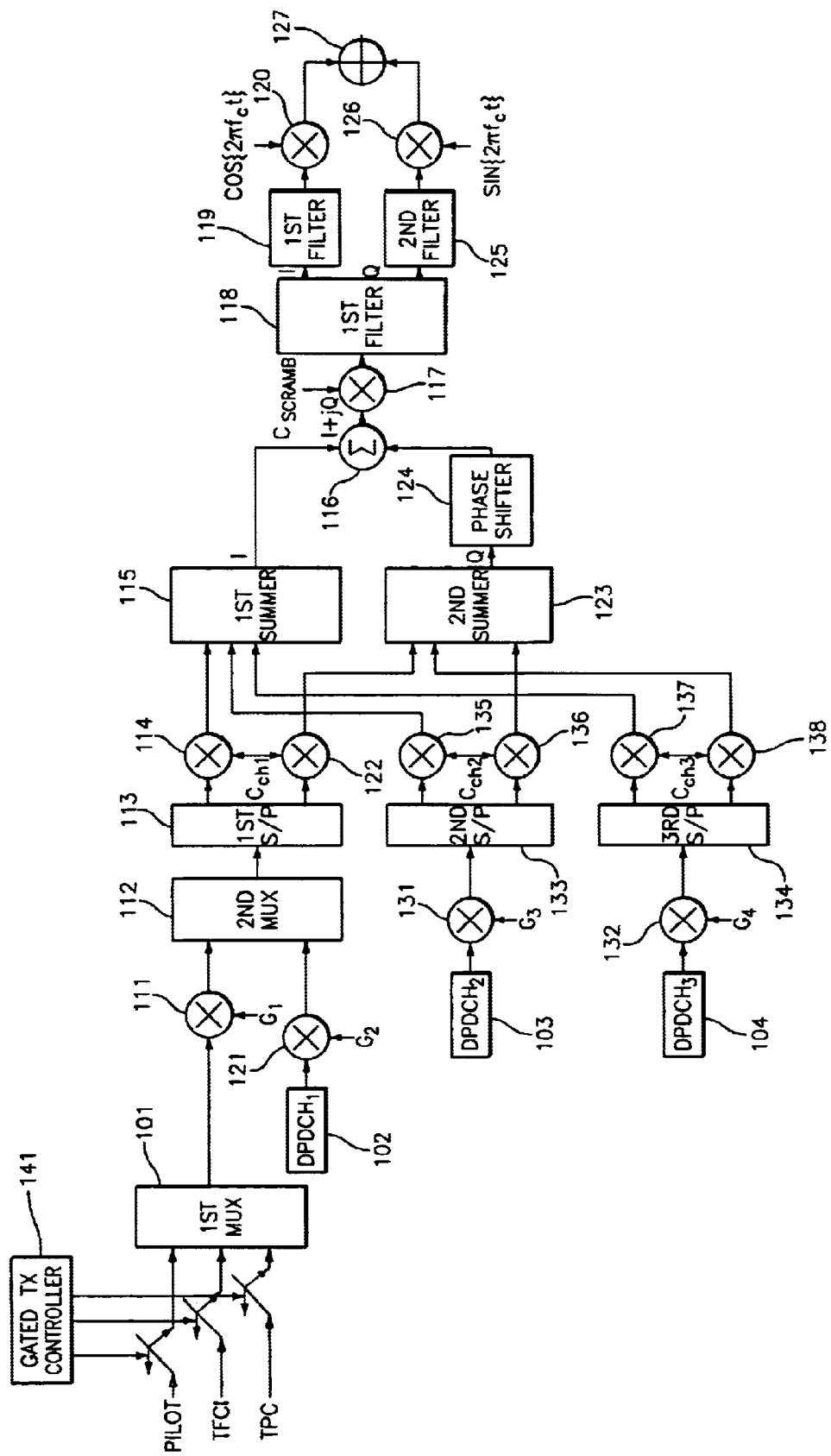
FIG. 10A is a diagram illustrating a structure of a base station transmitter according to another embodiment of the present invention.
Figure 10B:
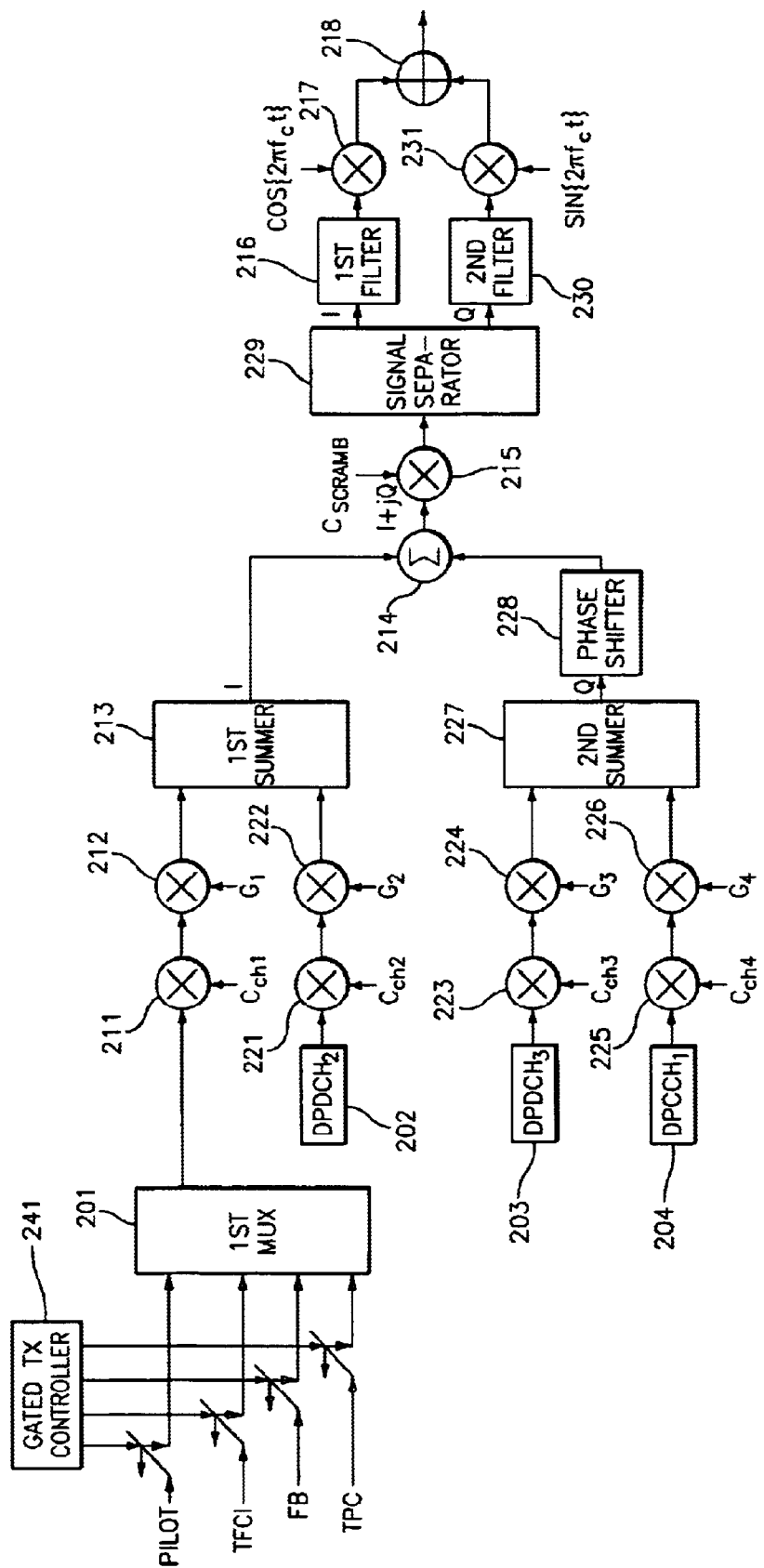
FIG. 10B is a diagram illustrating a structure of a mobile station transmitter according to another embodiment of the present invention.

In the foregoing drawings and descriptions, the downlink and uplink frames have the same frame starting point. However, in the UTRA system, the starting point of the uplink frame is artificially delayed by 250 μsec as compared with the starting point of the downlink frame. This is to make power control time delay become one slot (=0.625 ms) in consideration of the propagation delay of the transmission signal when the cell radius is below 30 km. Therefore, with due consideration of the artificial time delay between the downlink and uplink frame start time, the methods for transmitting the DPCCH signal according to gated transmission are shown by FIGS. 11A to 11E. FIGS. 10A and 10B show structures of the base station controller and the mobile station controller, respectively, which enable such gated transmission.

FIG. 10A shows a structure of the base station controller according to another embodiment of the present invention. The base station transmitter is different from FIG. 4A in that the pilot, TFCI and TPC bits constituting the downlink DPCCH can be separately gated according to different gating patterns by the gated transmission controller 141. That is, the gated transmission controller 141 performs gated transmission on the pilot, TFCI and TPC bits for the downlink DPCCH at a power control group (or time slot) scheduled with the mobile station in the control-only substate where the traffic data is not transmitted over the downlink and uplink DPDCHs. By using the gated transmission controller 141, it is also possible to assemble a pilot of a nth slot and TFCI and TPC bits of a (n+1)th slot into a gated transmission unit. When the base station transmits signaling data using the gated transmission controller 141 during gated transmission in the control-only substate, it is possible to avoid performing gated transmission on the pilot and TFCI at the duration where the signaling data is transmitted.

Alternatively, the gated transmission controller 141 can perform gated transmission on one power control group (or one entire slot) including the pilot symbols, TFCI and TPC bits for the downlink DPCCH at a power control group (or time slot) scheduled with the mobile station in the control-only substate when the traffic data is not transmitted over the downlink and uplink DPDCHs.

Although the downlink gated transmission pattern is identical to the uplink gated transmission pattern, there can exist an offset therebetween for efficient power control. The offset is given as a system parameter.

FIG. 10B shows a structure of the mobile station transmitter according to another embodiment of the present invention. The mobile station transmitter is different from FIG. 4B in that the pilot, TFCI, FBI and TPC bits constituting the uplink DPCCH can be separately gated according to different patterns by the gated transmission controller 241. The gated transmission controller 241 gates transmission of the pilot, FTCI, FBI and TPC bits for the uplink DPCCH at a power control group (or time slot) scheduled with the mobile station in the control-only substate when the traffic data is not transmitted over the downlink and uplink DPDCHs. When the base station transmits signaling data using the gated transmission controller 241 during gated transmission in the control-only substate, it is possible to avoid performing gated transmission on the pilot and TFCI at the duration when the signaling data is transmitted.

Alternatively, the gated transmission controller 241 can perform gated transmission on one power control group (or one entire slot) including the pilot symbols, TFCI, FBI and TPC bits for the uplink DPCCH at a power control group (or time slot) scheduled with the mobile station in the control-only substate when the traffic data is not transmitted over the downlink and uplink DPDCHs.

Although the downlink gated transmission pattern is identical to the uplink gated transmission pattern, there can exist an offset therebetween for efficient power control. The offset is given as a system parameter.

FIGS. 11A to 11E and FIGS. 12A to 12E show signal transmission diagrams for gated transmission performed by the base station and the mobile station transmitters of FIGS. 10A and 10B. FIGS. 11A to 11E show how to perform gated transmission when the frame length is 10 msec and each frame includes 16 power control groups, i.e., each power control group has a length of 0.625 msec. FIGS. 12A to 12E show how to perform gated transmission when the frame length is 10 msec and each frame includes 15 power control groups, i.e., each power control group has a length of 0.667 msec.

Figure 11A:
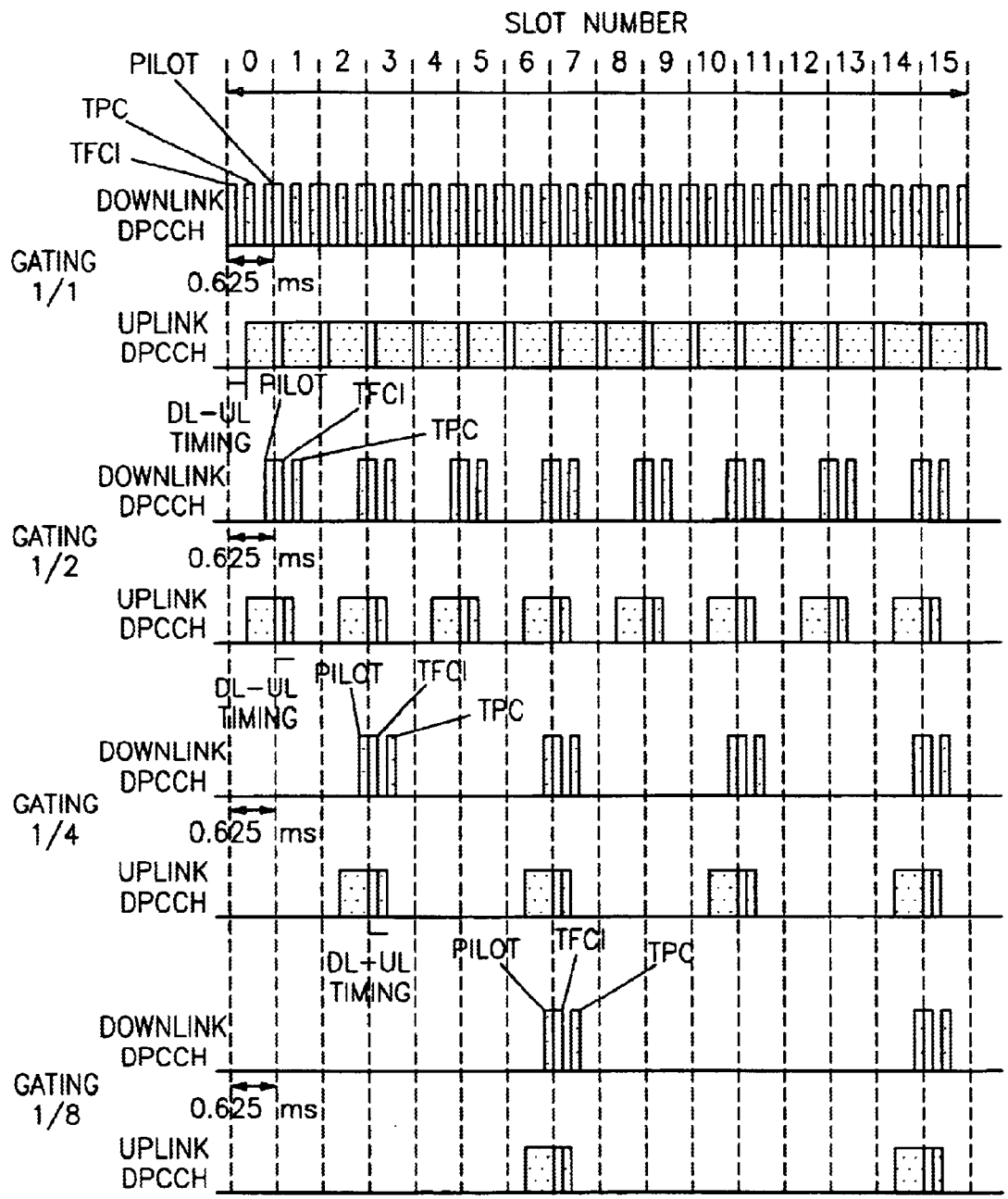
FIG. 11A is a diagram illustrating gated transmission for downlink and uplink DPCCHs according to a first embodiment of the present invention.

FIG. 11A shows gated transmission for the downlink and uplink DPCCHs according to a first embodiment of the present invention. As shown in FIG. 11A, a gated transmission unit for the downlink DPCCH may not be a slot unit. That is, with regard to two adjacent slots, a pilot symbol of a predetermined nth slot and TFCI and TPC bits of a (n+1)th slot are set as a gated transmission unit for the downlink DPCCH because the pilot symbol is used for channel estimation to detect the TFCI and TPC. For example, when the gating rate is ½, a pilot symbol of slot number 0 and TFCI and TPC bits of slot number 1 are set as a gated transmission unit for the downlink DPCCH. When the gating rate is ¼, a pilot symbol of slot number 2 and TFCI and TPC bits of slot number 3 are set as a gated transmission unit for the downlink DPCCH. When the gating rate is ⅛, a pilot symbol of slot number 6 and TFCI and TPC bits of slot number 7 are set as a gated transmission unit for the downlink DPCCH. Here, the gated transmission unit for the downlink DPCCH is set to be different from the actual slot unit, since an nth pilot symbol may be required in the receiver to demodulate the (n+1)th TPC according to a demodulation method for the TPC signal.

When a signaling message is generated during such gated transmission, the signaling message is transmitted over the downlink or uplink DPDCH. Therefore, performance of the frame starting point is very important. In the invention, as shown in FIG. 11A, the TPC for the downlink DPCCH and the TPC for the uplink DPCCH are located at slot number 15 (i.e., the 16$^{th}$ slot, which is the last slot of the nth frame), so that the first slot of the (n+1)th frame is power controlled using the TPC bits existing in the last slot of an nth frame. That is, the TPC for power controlling the first slot of the next frame is located at the last slot of the present frame.

Meanwhile, in the UTRA system stated above, an offset between the downlink and uplink frame start points is fixed to 250 μsec. However, in gated transmission of the downlink and uplink DPCCHs, the offset value can be changed to an arbitrary value while the base station and the mobile station exchange a parameter for DPCCH gated transmission in the call setup process. The offset value is set to a proper value in consideration of propagation delay of the base station and the mobile station in the call setup process. That is, when the cell radius is over 30 Km, the offset value can be set to a value larger than the conventional offset value of 250 μsec for DPCCH gated transmission, and this value can be determined through experiments.

Figure 11B:
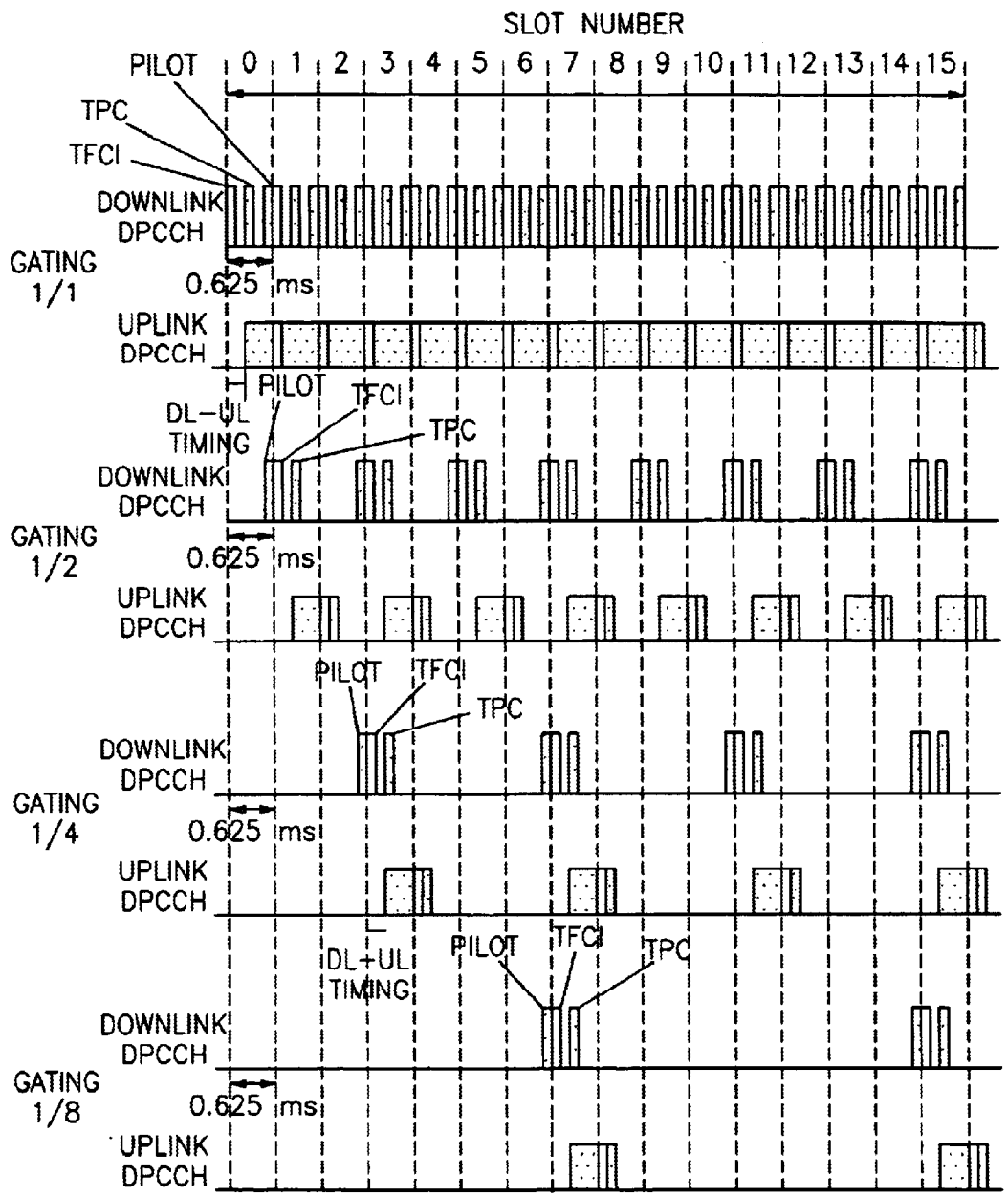
FIG. 11B is a diagram illustrating gated transmission for downlink and uplink DPCCHs according to a second embodiment of the present invention.

FIG. 11B shows gated transmission for the downlink and uplink DPCCHs according to a second embodiment of the present invention. FIG. 11B shows a case where transmission of the downlink DPCCH goes ahead of transmission of the uplink DPCCH during gated transmission, for the gating rates of ½, ¼ and ⅛. The difference (i.e., offset) is designated by "DL-UL timing" for the gating rates of ½, ¼ and ⅛.

Referring to FIG. 11B, with regard to two adjacent slots, a pilot symbol of the predetermined nth slot and TFCI and TPC of the (n+1)th slot are set as a gated transmission unit for the downlink DPCCH. For example, for the gating rate ½, a pilot symbol of slot number 0 and TFCI and TPC of slot number 1 are set as a gated transmission unit for the downlink DPCCH. For the gating rate ¼, a pilot symbol of slot number 2 and TFCI and TPC of slot number 3 are set as a gated transmission unit for the downlink DPCCH. For the gating rate ⅛, a pilot symbol of slot number 6 and TFCI and TPC of slot number 7 are set as a gated transmission unit for the downlink DPCCH.

In addition, it is noted that the TPC for power controlling the first slot of the next frame is located at the last slot of the present frame. That is, the TPC for the downlink DPCCH and the TPC for the uplink DPCCH are both located at slot number 15 (i.e., the $16^{th}$ slot).

Figure 11C:
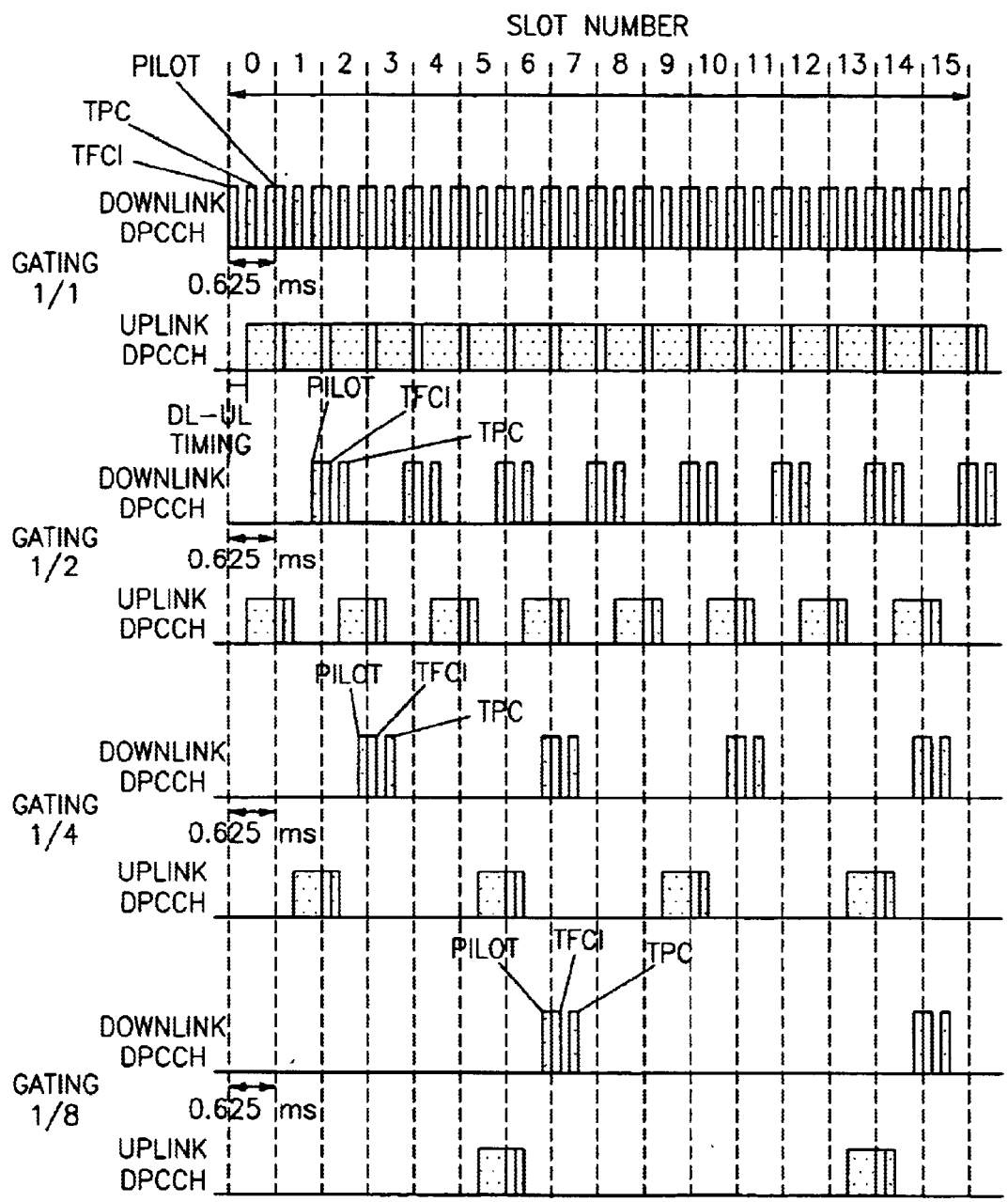
FIG. 11C is a diagram illustrating gated transmission for downlink and uplink DPCCHs according to a third embodiment of the present invention.

FIG. 11C shows gated transmission for the downlink and uplink DPCCHs according to a third embodiment of the present invention. FIG. 11C shows a case where transmission of the uplink DPCCH goes ahead of transmission of the downlink DPCCH during gated transmission, for the gating rates of ½, ¼ and ⅛.

Referring to FIG. 11C, with regard to two adjacent slots, a pilot symbol of the predetermined nth slot and TFCI and TPC of the (n+1)th slot are set as a gated transmission unit for the downlink DPCCH. For example, for the gating rate ½, a pilot symbol of slot number 1 and TFCI and TPC of slot number 2 are set as a gated transmission unit for the downlink DPCCH. For the gating rate ¼, a pilot symbol of slot number 2 and TFCI and TPC of slot number 3 are set as a gated transmission unit for the downlink DPCCH. For the gating rate ⅛, a pilot symbol of slot number 6 and TFCI and TPC of slot number 7 are set as a gated transmission unit for the downlink DPCCH.

In addition, it is noted that the TPC for power controlling the first slot of the next frame is located at the last slot of the present frame. That is, the TPC for the downlink DPCCH and the TPC for the uplink DPCCH are both located at a slot number 15 (i.e., the $16^{th}$ slot).

Figure 11D:
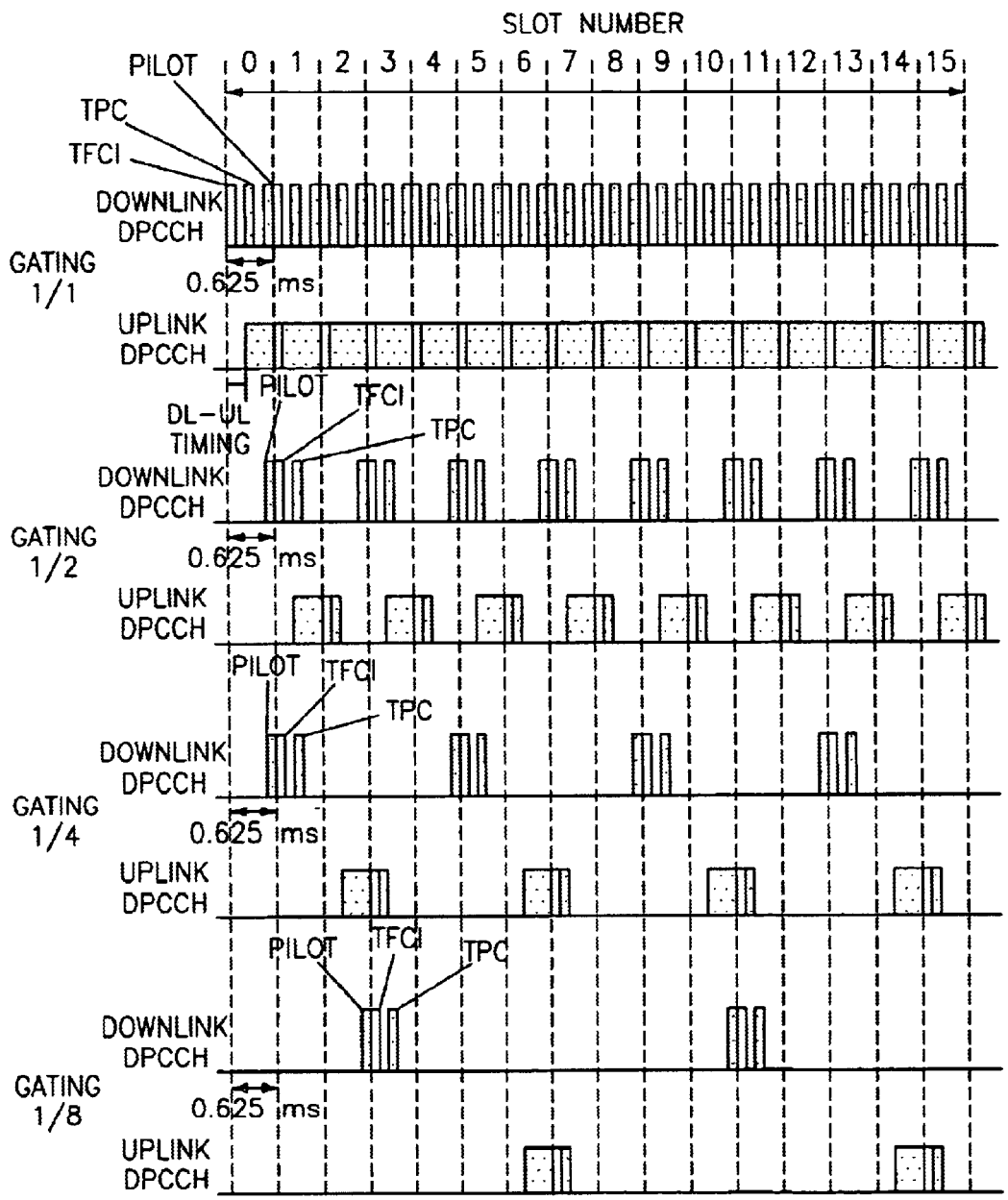
FIG. 11D is a diagram illustrating gated transmission for downlink and uplink DPCCHs according to a fourth embodiment of the present invention.

FIG. 11D shows gated transmission for the downlink and uplink DPCCHs according to a fourth embodiment of the present invention. FIG. 11D shows a case where for the gating rates of ½, ¼ and ⅛, transmission of the downlink DPCCH goes ahead of transmission of the uplink DPCCH during gated transmission, and the downlink and uplink gating patterns are set to the same period.

Referring to FIG. 11D, with regard to two adjacent slots, a pilot symbol of the predetermined nth slot and TFCI and TPC of the (n+1)th slot are set as a gated transmission unit for the downlink DPCCH. For example, for the gating rate ½, a pilot symbol of slot number 0 and TFCI and TPC of slot number 1 are set as a gated transmission unit for the downlink DPCCH. For the gating rate ¼, a pilot symbol of slot number 0 and TFCI and TPC of slot number 1 are set as a gated transmission unit for the downlink DPCCH. For the gating rate ⅛, a pilot symbol of slot number 2 and TFCI and TPC of slot number 3 are set as a gated transmission unit for the downlink DPCCH.

In addition, it is noted that the TPC for power controlling the first slot of the next frame is located at the last slot of the present frame. That is, the TPC for the downlink DPCCH and the TPC for the uplink DPCCH are both located at slot number 15 (i.e., the $16^{th}$ slot).

Figure 11E:
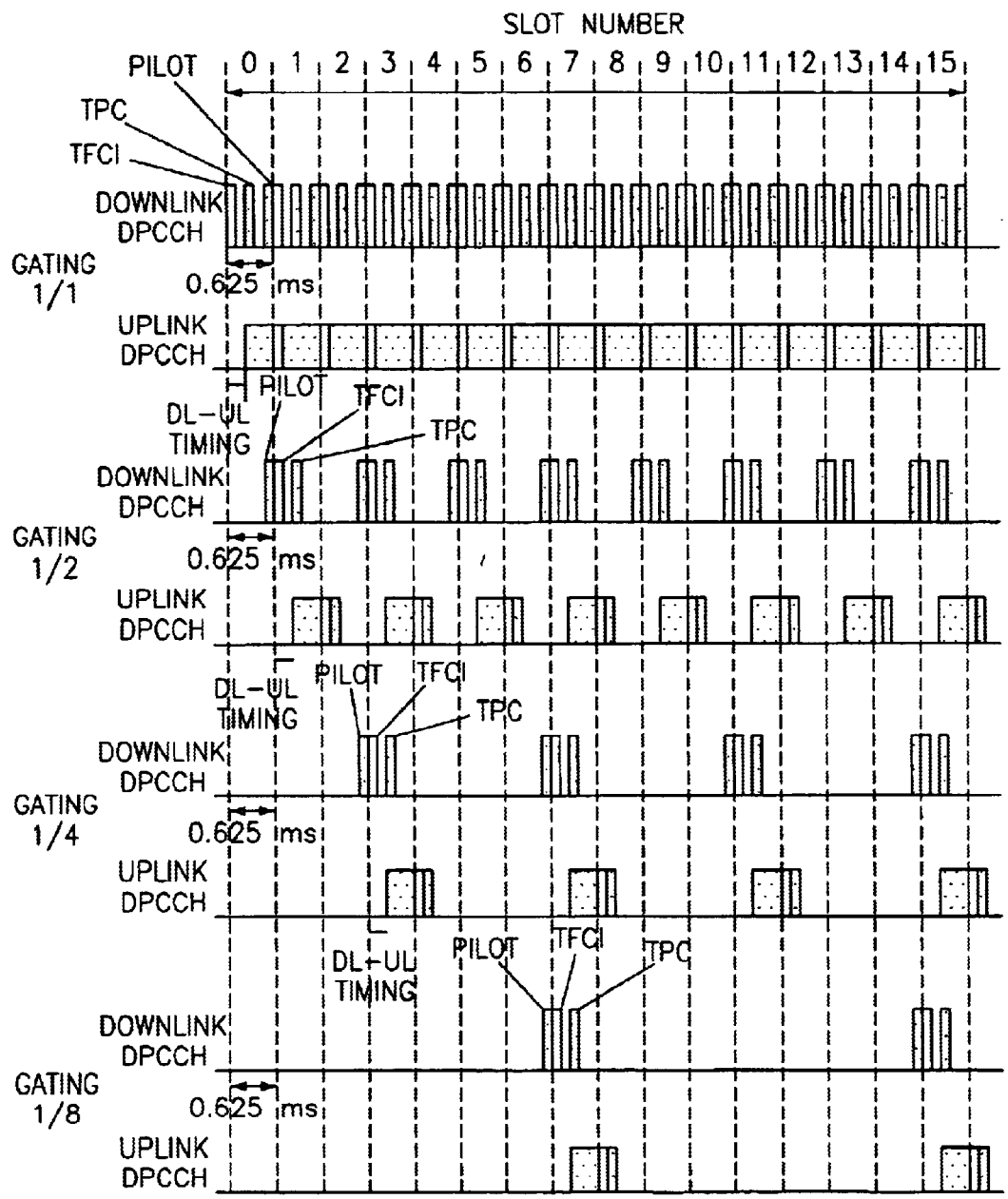
FIG. 11E is a diagram illustrating gated transmission for downlink and uplink DPCCHs according to a fifth embodiment of the present invention.

FIG. 11E shows gated transmission for the downlink and uplink DPCCHs according to a fifth embodiment of the present invention. FIG. 11E shows a case where for the gating rates of ½, ¼ and ⅛, transmission of the uplink DPCCH goes ahead of transmission of the downlink DPCCH during gated transmission, and the downlink and uplink gating patterns are set to the same period.

Referring to FIG. 11E, with regard to two adjacent slots, a pilot symbol of the nth slot and TFCI and TPC of the (n+1)th slot are set as a gated transmission unit for the downlink DPCCH. For example, for the gating rate ½, a pilot symbol of slot number 1 and TFCI and TPC of slot number 2 are set as a gated transmission unit for the downlink DPCCH. For the gating rate ¼, a pilot symbol of slot number 2 and TFCI and TPC of slot number 3 are set as a gated transmission unit for the downlink DPCCH. For the gating rate ⅛, a pilot symbol of slot number 6 and TFCI and TPC of slot number 7 are set as a gated transmission unit for the downlink DPCCH.

In addition, it is noted that the TPC for power controlling the first slot of the next frame is located at the last slot of the present frame. That is, the TPC for the downlink DPCCH and the TPC for the uplink DPCCH are both located at a slot number 15 (i.e., the $16^{th}$ slot).

Figure 12A:
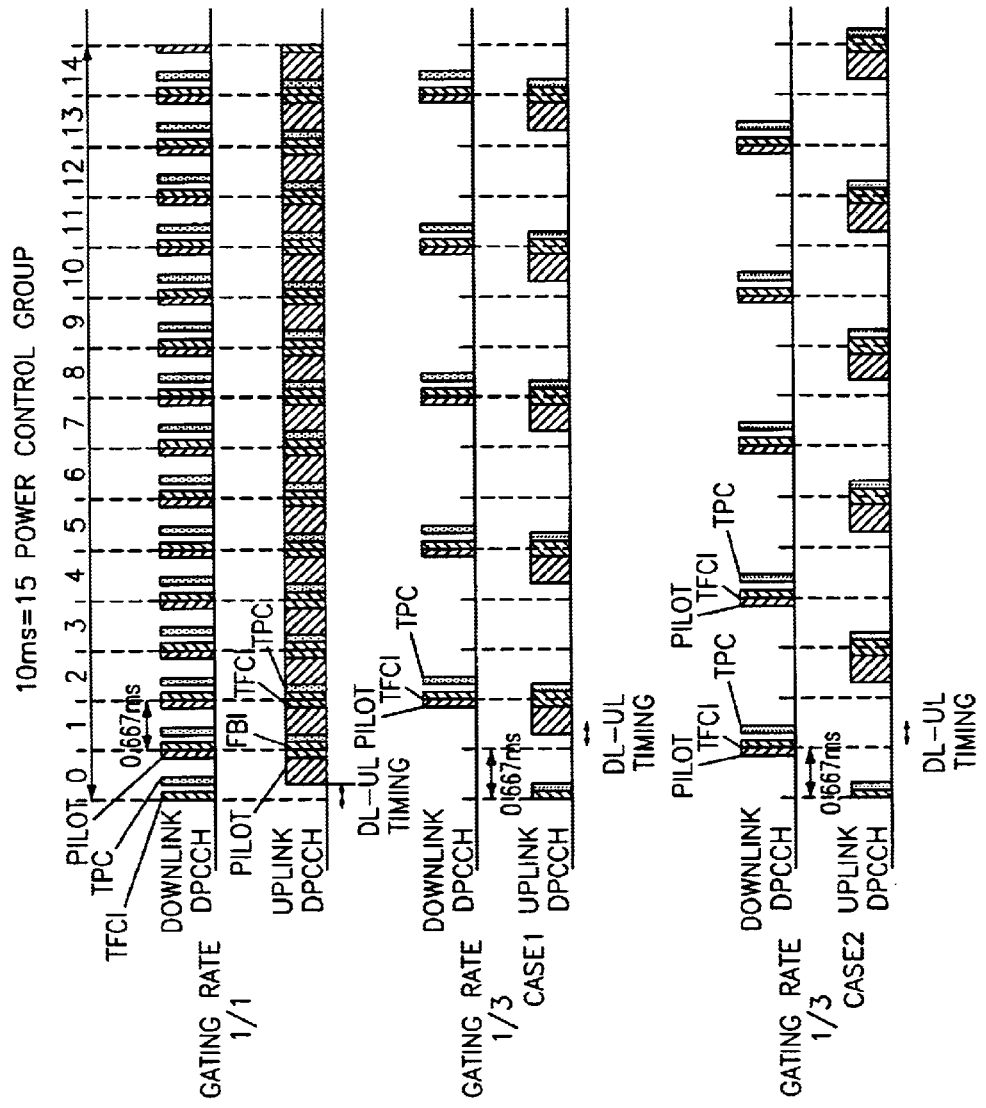
FIG. 12A is a diagram illustrating gated transmission for downlink and uplink DPCCHs according to a sixth embodiment of the present invention.
Figure 12A:
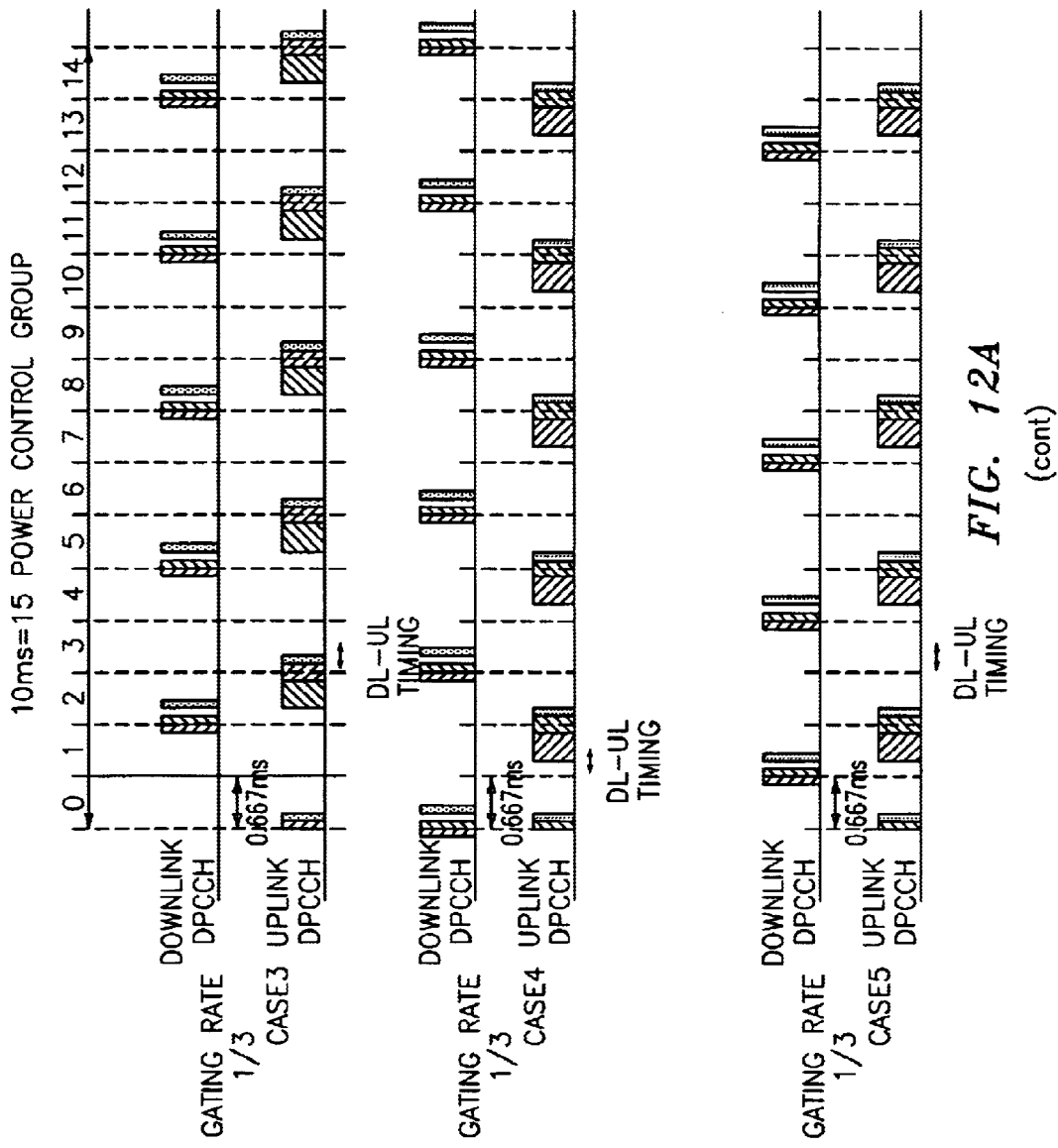

FIG. 12A shows gated transmission for the downlink and uplink DPCCHs according to a sixth embodiment of the present invention. FIG. 12A shows a case where a gating rate for gated transmission of the downlink and uplink DPCCHs is ⅓, i.e., gated transmission is performed at the periods corresponding to ⅓ power control groups of the whole power control groups. That is, gated transmission is performed at the periods corresponding to 5 power control groups out of the whole 15 power control groups. At this point, a gated transmission unit for the downlink DPCCH is set to be different from a slot unit. That is, with regard to two adjacent slots, a pilot symbol of the predetermined nth slot and TFCI and TPC of the (n+1)th slot are set as a gated transmission unit for the downlink DPCCH because the pilot symbol is used for channel estimation to detect the TFCI and the TPC.

In FIG. 12A, <Case 1> shows a case where the uplink DPCCH and the downlink DPCCH are transmitted at the same time during gated transmission, and the downlink and uplink gating patterns are set to the same period. With regard to two adjacent slots, a pilot symbol of slot number 1 and TFCI and TPC of slot number 2 are set as a gated transmission unit for the downlink DPCCH; a pilot symbol of slot number 4 and TFCI and TPC of slot number 5 are set as a gated transmission unit for the downlink DPCCH; a pilot symbol of slot number 7 and TFCI and TPC of slot number 8 are set as a gated transmission unit for the downlink DPCCH; a pilot symbol of slot number 10 and TFCI and TPC of slot number 11 are set as a gated transmission unit for the downlink DPCCH; and a pilot symbol of slot number 13 and TFCI and TPC of slot number 14 are set as a gated transmission unit for the downlink DPCCH.

<Case 2> shows a case where transmission of the uplink DPCCH occurs before transmission of the downlink DPCCH during gated transmission. At this point, with regard to two adjacent slots, a pilot symbol of slot number 0 and TFCI and TPC of slot number 1 are set as a gated transmission unit for the downlink DPCCH; a pilot symbol of slot number 3 and TFCI and TPC of slot number 4 are set as a gated transmission unit for the downlink DPCCH; a pilot symbol of slot number 6 and TFCI and TPC of slot number 7 are set as a gated transmission unit for the downlink DPCCH; a pilot symbol of slot number 9 and TFCI and TPC of slot number 10 are set as a gated transmission unit for the downlink DPCCH; and a pilot symbol of slot number 12 and TFCI and TPC of slot number 13 are set as a gated transmission unit for the downlink DPCCH.

<Case 3> shows a case where transmission of the uplink DPCCH occurs before transmission of the downlink DPCCH during gated transmission. At this point, with regard to two adjacent slots, a pilot symbol of slot number 1 and TFCI and TPC of slot number 2 are set as a gated transmission unit for the downlink DPCCH; a pilot symbol of slot number 4 and TFCI and TPC of slot number 5 are set as a gated transmission unit for the downlink DPCCH; a pilot symbol of slot number 7 and TFCI and TPC of slot number 8 are set as a gated transmission unit for the downlink DPCCH; a pilot symbol of slot number 10 and TFCI and TPC of slot number 11 are set as a gated transmission unit for the downlink DPCCH; and a pilot symbol of slot number 13 and TFCI and TPC of slot number 14 are set as a gated transmission unit for the downlink DPCCH.

<Case 4> shows a case where transmission of the uplink DPCCH occurs after transmission of the downlink DPCCH during gated transmission. At this point, with regard to two adjacent slots, a pilot symbol of slot number 14 and TFCI and TPC of slot number 0 are set as a gated transmission unit for the downlink DPCCH; a pilot symbol of slot number 2 and TFCI and TPC of slot number 3 are set as a gated transmission unit for the downlink DPCCH; a pilot symbol of slot number 5 and TFCI and TPC of slot number 6 are set as a gated transmission unit for the downlink DPCCH; a pilot symbol of slot number 8 and TFCI and TPC of slot number 9 are set as a gated transmission unit for the downlink DPCCH; and a pilot symbol of slot number 11 and TFCI and TPC of slot number 12 are set as a gated transmission unit for the downlink DPCCH.

<Case 5> shows a case where transmission of the uplink DPCCH occurs after transmission of the downlink DPCCH during gated transmission. At this point, with regard to two adjacent slots, a pilot symbol of slot number 0 and TFCI and TPC of slot number 1 are set as a gated transmission unit for the downlink DPCCH; a pilot symbol of slot number 3 and TFCI and TPC of slot number 4 are set as a gated transmission unit for the downlink DPCCH; a pilot symbol of slot number 6 and TFCI and TPC of slot number 7 are set as a gated transmission unit for the downlink DPCCH; a pilot symbol of slot number 9 and TFCI and TPC of slot number 10 are set as a gated transmission unit for the downlink DPCCH; and a pilot symbol of slot number 12 and TFCI and TPC of a slot number 13 are set as a gated transmission unit for the downlink DPCCH.

Figure 12B:
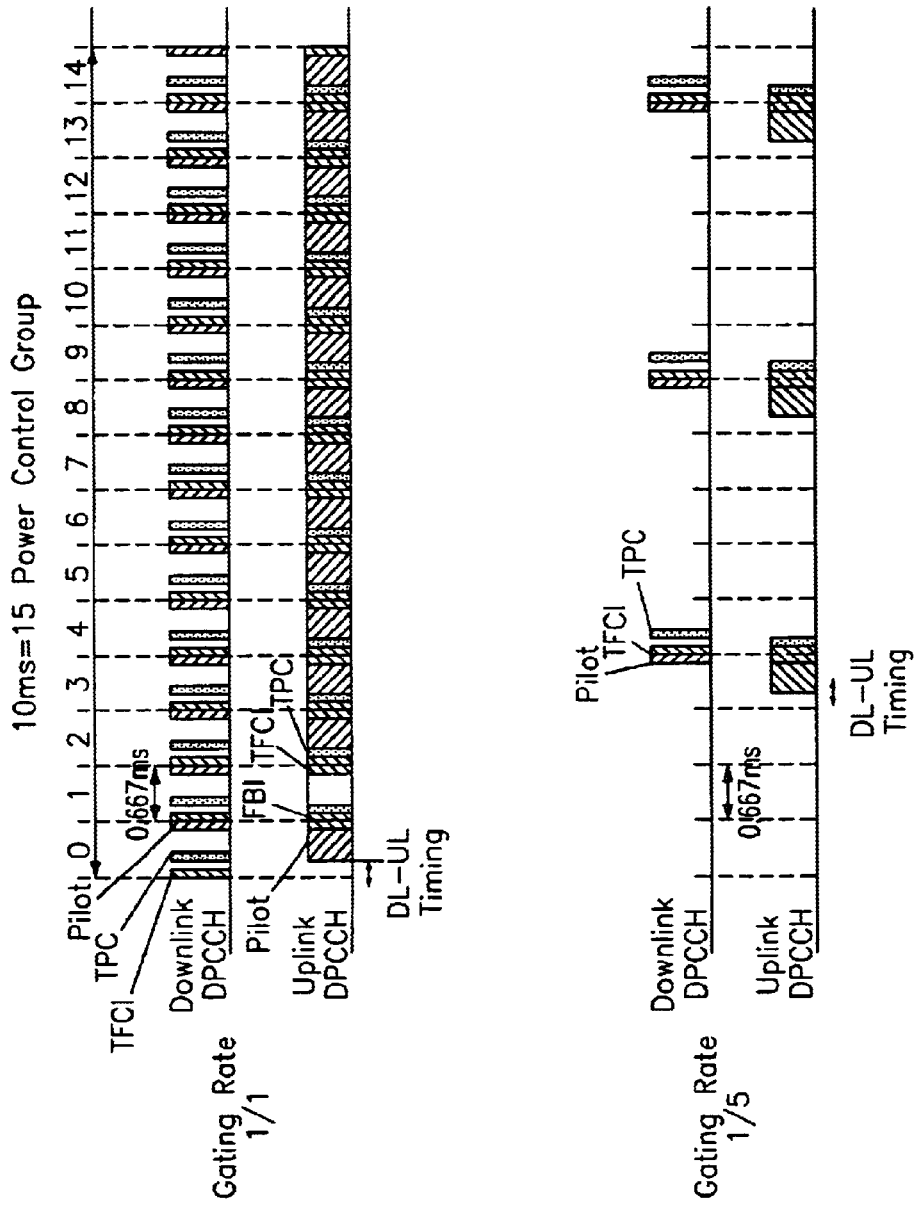
FIG. 12B is a diagram illustrating gated transmission for downlink and uplink DPCCHs according to a seventh embodiment of the present invention.

FIG. 12B shows gated transmission for the downlink and uplink DPCCHs according to a seventh embodiment of the present invention. FIG. 12A shows a case where the gating rate for gated transmission of the downlink and uplink DPCCHs is $1/5$, i.e., gated transmission is performed so that $1/5$ of the power control groups are transmitted in comparison to all the power control groups in standard transmission. That is, gated transmission is performed so that 3 power control groups out of the standard 15 power control groups are transmitted. At this point, a gated transmission unit for the downlink DPCCH is set to be different from a slot unit. That is, with regard to two adjacent slots, a pilot symbol of the predetermined nth slot and TFCI and TPC of the (n+1)th slot are set as a gated transmission unit for the downlink DPCCH because the pilot symbol is used for channel estimation to detect the TFCI and the TPC.

Referring to FIG. 12B, with regard to two adjacent slots, a pilot symbol of slot number 3 and TFCI and TPC of slot number 4 are set as a gated transmission unit for the downlink DPCCH; a pilot symbol of slot number 8 and TFCI and TPC of slot number 9 are set as a gated transmission unit for the downlink DPCCH; and a pilot symbol of slot number 13 and TFCI and TPC of slot number 14 are set as a gated transmission unit for the downlink DPCCH.

Figure 12C:
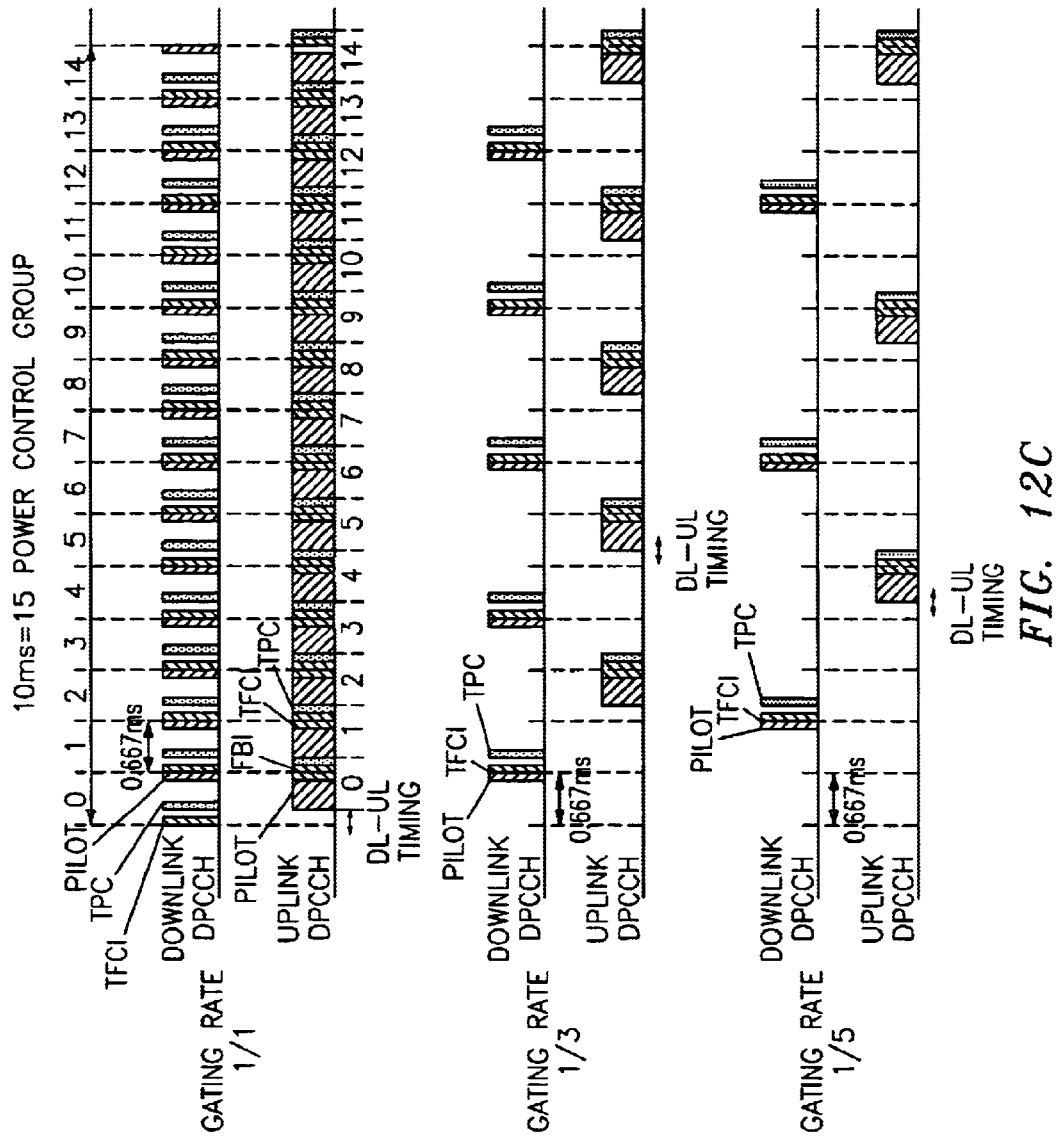
FIG. 12C is a diagram illustrating gated transmission for downlink and uplink DPCCHs according to a eighth embodiment of the present invention.

FIG. 12C shows gated transmission for the downlink and uplink DPCCHs according to an eighth embodiment of the present invention. Referring to FIG. 12C, the gating pattern is set such that the last power control group of the uplink DPCCH should not be gated in the gated transmission. Such a gating pattern has high channel estimation performance, since the base station can perform channel estimation using the pilot symbols in the last power control group of the frame. In addition, it is possible to increase the time required when the base station processes the FBI bits transmitted from the mobile station.

Figure 12D:
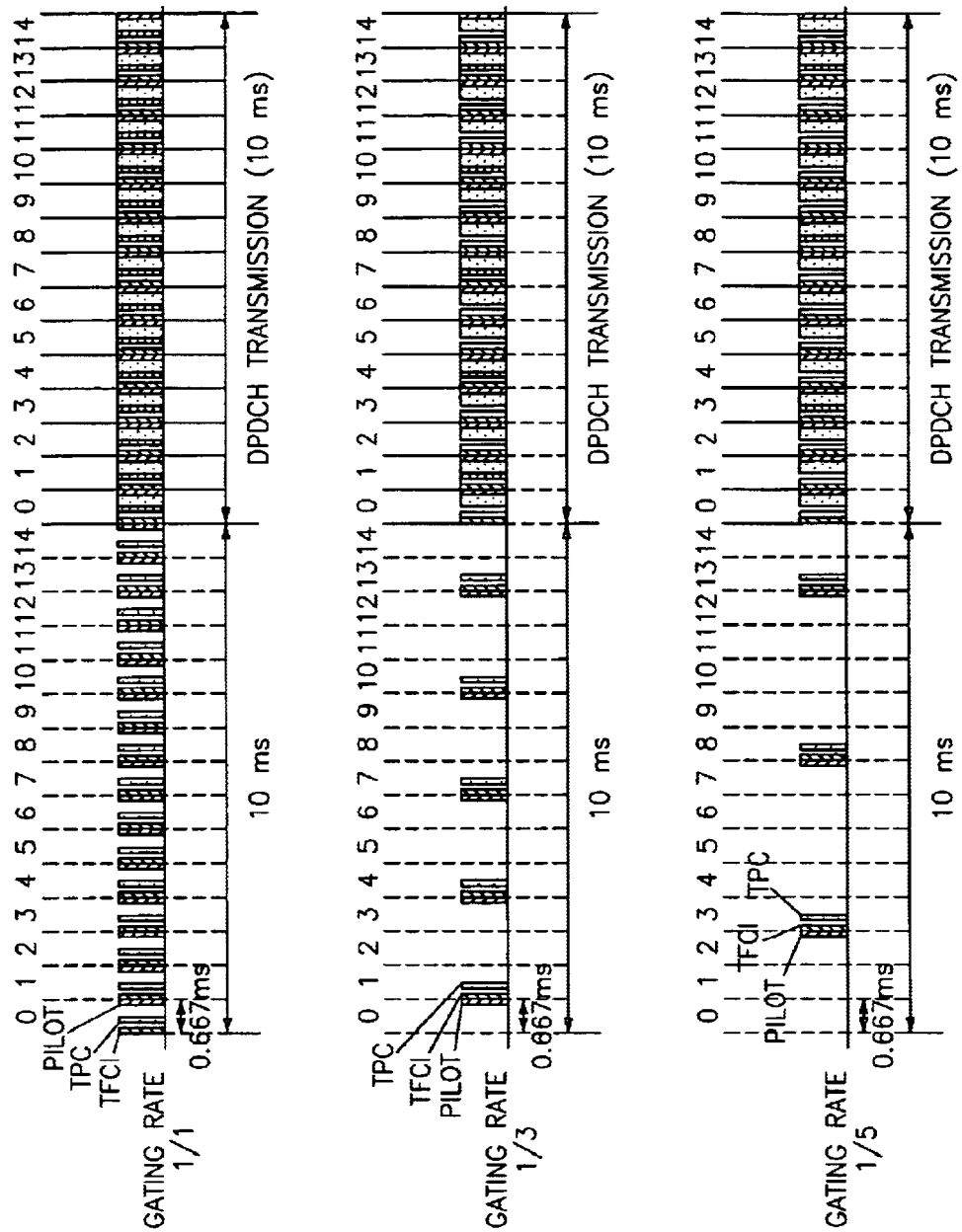
FIG. 12D is a diagram illustrating gated transmission for downlink and uplink DPCCHs according to a ninth embodiment of the present invention.

FIG. 12D shows gated transmission for the downlink and uplink DPCCHs according to a ninth embodiment of the present invention. Shown is a gating pattern for transmitting a downlink message during gated transmission.

Referring to FIG. 12D, for the frame period where the downlink message is transmitted (i.e., DPDCH transmission period), gated transmission is discontinued for the pilot and TFCI, and only the TPC continues to undergo gated transmission according to the gating pattern. For the period where the downlink data (message) is not transmitted, the pilot symbols and TFCI as well as TPC undergo gated transmission. The pilot symbol is transmitted at the $0^{th}$, $3^{rd}$, $6^{th}$, $9^{th}$ and $12^{th}$ slots only, and the TFCI and TPC bits are transmitted at the $1^{st}$, $4^{th}$, $7^{th}$, $10^{th}$ and $13^{th}$ slots only. When the downlink data is transmitted during such gated transmission, the pilot symbol and TFCI are transmitted at every slot, whereas TPC is transmitted at the $1^{st}$, $4^{th}$, $7^{th}$ $10^{th}$ and $13^{th}$ slots only. Accordingly, even though downlink transmission data is generated during gated transmission, the power control rate is maintained.

Figure 12E:
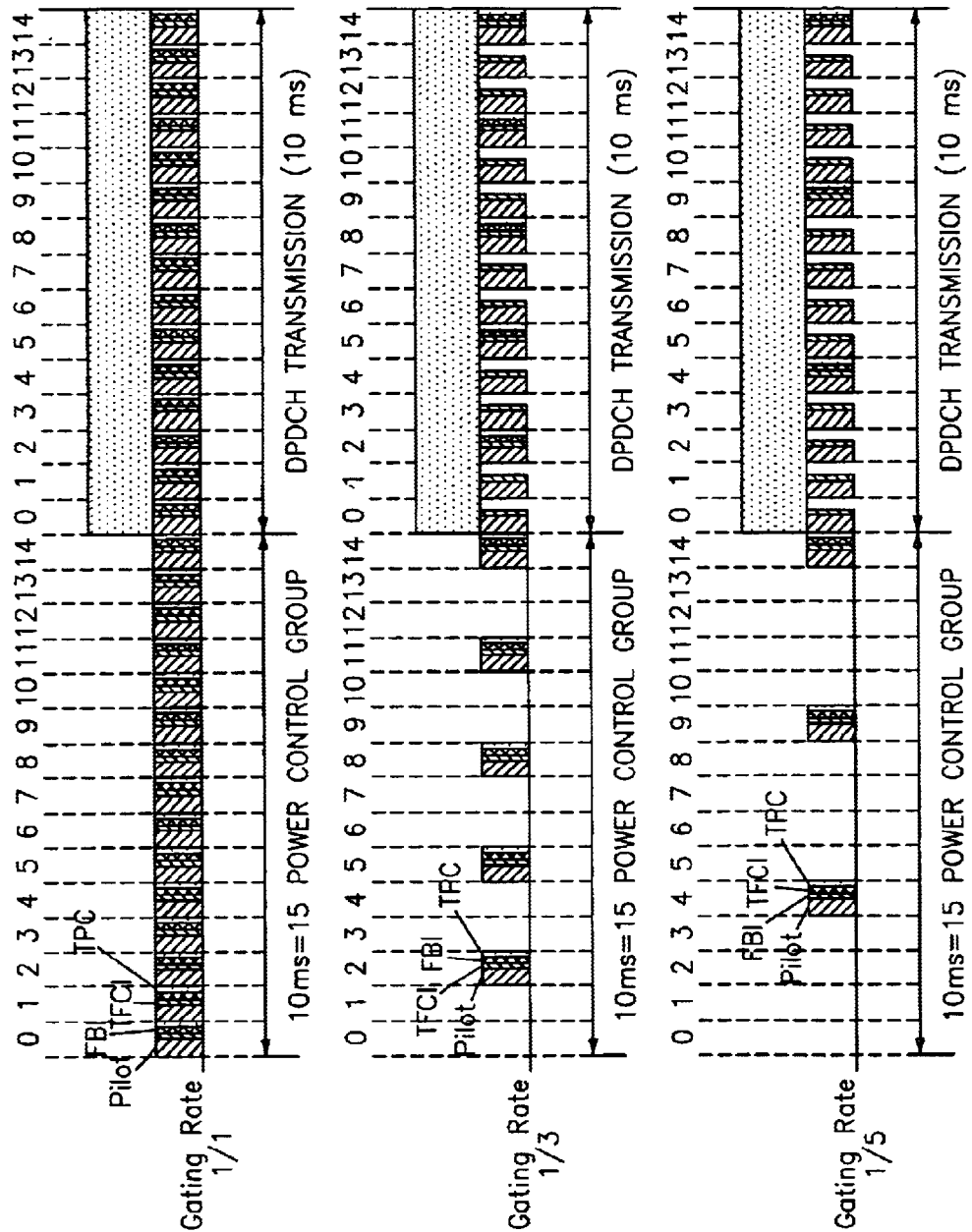
FIG. 12E is a diagram illustrating gated transmission for downlink and uplink DPCCHs according to a tenth embodiment of the present invention.

FIG. 12E shows gated transmission for the downlink and uplink DPCCHs according to a tenth embodiment of the present invention. Shown is a gating pattern for transmitting a uplink message during gated transmission. For a period where the uplink data (message) is not transmitted, the pilot symbols and TFCI as well as TPC and FBI undergo gated transmission. The pilot symbol, TFCI, FBI and TPC are transmitted at $2^{nd}$, $5^{th}$, $8^{th}$, $11^{th}$ and $14^{th}$ slots only. When the uplink data is transmitted during such gated transmission, the pilot symbol and TFCI are transmitted at every slot, whereas TPC and FBI are transmitted at the $2^{nd}$, $5^{th}$, $8^{th}$, $11^{th}$ and 14th slots only. Accordingly, even though uplink transmission data is generated during gated transmission, the power control rate is maintained.

As shown in FIGS. 12D and 12E, for the DPDCH transmission period where the uplink message is transmitted, several embodiments of the invention discontinue gated transmission of the pilot and TFCI and continue to transmit FBI and TPC according to the gating rate.

As described above, the invention minimizes the time required for the sync reacquisition process in the base station, minimizes interference and mobile station power consumption resulting from uplink DPCCH transmission, and minimizes interference due to the transmission of the uplink power control bit over the downlink, all of which increases the capacity of the mobile communication system.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for transmitting downlink signals in a base station which communicates with a base station that asynchronously operates with other base stations, the down link signals including a data transmission channel signal and a physical control signal which have control data related to connection or release of the data transmission channel and the physical control signal, correspond to the data transmission channel when there is data to transmit on the data transmission channel for a mobile communication system, comprising the steps of:

determining whether the base station has downlink data to transmit to the mobile station on the data transmission channel; and gating transmission of the physical control signal according to a predetermined gated on or off pattern when there is no data to transmit on the data transmission channel for a predetermined period of time.

2. The method as claimed in claim 1, wherein the physical control signal is transmitted in a gated on slot format, said slot having a power control bit which controls the uplink transmission power.

3. The method as claimed in claim 2, wherein the slot format includes pilot symbols, transport format combination indicator (TFCI) bits and the power control bit, and the predetermined pattern is a pattern for gating transmission of the pilot symbol, the TFCI bits and the power control bit at a predetermined nth slot out of total slots of a frame.

4. The method as claimed in claim 3, wherein the slot format includes pilot symbols, TFCI bits and power control bit, and the predetermined pattern is a pattern for gating transmission of the pilot symbols at a predetermined nth slot and the TFCI bits and the power control bit at a (n+1)th slot.

5. The method as claimed in claim 2, wherein the power control bit gating transmission is regularly maintained when the base station transmits the data to the mobile station.

6. A method for transmitting a uplink signals in a mobile station which communicates with a base station that asynchronously operates with other base stations, the uplink signals including a data transmission channel signal and a physical control signal which have control data related to connection or release of the data transmission channel and the physical control signal, correspond to the data transmission channel when there is data to transmit on the data transmission channel of a mobile communication system, comprising the steps of:

determining whether the mobile station has the data to transmit to the base station on the data transmission channel; and gating transmission of the physical control signal according to a predetermined gated on or off pattern when there is no data to transmit on the data transmission channel for a predetermined period of time.

7. The method as claimed in claim 6, wherein the physical control signal have a frame format, and said frame including a plurality of slots.

8. The method as claimed in claim 6, wherein the physical control signal includes at least frame format of the data transmission channel.

9. The method as claimed in claim 6, wherein the physical control signal includes pilot symbols, transport format combination indicator (TFCI) bits, and feedback information (FBI) bits for at least one phase difference between at least two antennas when the base station uses transmit diversity antennas.

10. The method as claimed in claim 6, wherein the predetermined gated on or off pattern is a pattern for gating transmission of pilot symbols, TFCI bits, a power control bit, and the FBI bits at predetermined slots.

11. The method as claimed in claim 6, wherein the physical control signal is transmitted continuously while the mobile station transmit the data to the base station on the data transmission channel.

12. The method as claimed in claim 6, wherein the transmission power of the data on the data transmission channel is increased to more than regular transmission in transition from a gated mode to normal mode.

13. A method for transmitting control information in a mobile communication system, comprising the steps of:

(a) determining whether a base station has data to transmit to a mobile station;

(b) transmitting a gating request message indicating a first gating start time and a first gating pattern to a mobile station when there has been no data to transmit for a predetermined period of time;

(c) gating, when the base station has received a gating request message and the first gating start time has been reached, transmission of first control information according to the first gating pattern within a frame on a downlink dedicated control channel, said downlink dedicated control channel being used for transmitting the first control information to the mobile station;

(d) determining whether the mobile station has data to transmit to the base station;

(e) transmitting a gating request message indicating a second gating start time and a second gating pattern to the base station when there has been no data to transmit for a predetermined period of time;

(f) gating, when the mobile station has received a gating request message from the base station and the second gating start time has been reached, transmission of second control information according to the second gating pattern within a frame on an uplink dedicated control channel, said uplink dedicated control channel being used for transmitting the second control information to the base station.

14. The method as claimed in claim 13, wherein the frame on the downlink dedicated control channel is segmented into a plurality of slots and the first gating pattern is a pattern for gating transmission of the first control information at predetermined slots.

15. The method as claimed in claim 13, wherein the first control information includes power control information.

16. The method as claimed in claim 14, wherein the first control information includes a pilot symbol, format information about a format of transmission data, and power information for power control.

17. The method as claimed in claim 16, wherein the first gating pattern is a pattern for gating transmission of the pilot symbol, the format information and the power information at every predetermined nth slot.

18. The method as claimed in claim 16, wherein the first gating pattern is a pattern for gating transmission of the pilot symbol at a predetermined nth slot, and the format information and the power information at a (n+1)th slot.

19. The method as claimed in claim 15, wherein gated transmission for the power control information is maintained when the base station generates data to be transmitted to the mobile station during gated transmission of the first control information.

20. The method as claimed in claim 13, wherein the frame on the uplink dedicated control channel is segmented into a plurality of slots and the second gating pattern is a pattern for gating transmission of the second control information at predetermined slots.

21. The method as claimed in claim 20, wherein the second control information includes power control information.

22. The method as claimed in claim 20, wherein the second control information includes a pilot symbol, format information about a format of the transmission data, and feedback request information for requesting information about at least one phase difference between at least two antennas when the base station uses transmit diversity antennas, and power information for power control.

23. The method as claimed in claim 22, wherein the second gating pattern is a pattern for gating transmission of the pilot symbol, the format information, the feedback request information and the power information at predetermined slots.

24. The method as claimed in claim 21, wherein gated transmission for the power control information is maintained when the mobile station has data to transmit to the base station during gated transmission of the second control information.

25. The method as claimed in claim 22, wherein gated transmission for the feedback request information and the power information is maintained when the mobile station has data to transmit to the base station during gated transmission of the second control information.

26. The method as claimed in claim 13, wherein there is an time offset between the first gating pattern and the second gating pattern.

* * * * *